(12) United States Patent
Maeda et al.

(10) Patent No.: US 10,859,956 B2
(45) Date of Patent: Dec. 8, 2020

(54) FIXING MEMBER AND HEAT FIXING DEVICE

(71) Applicant: CANON KABUSHIKI KAISHA, Tokyo (JP)

(72) Inventors: Matsutaka Maeda, Kawasaki (JP); Mamo Matsumoto, Hiratsuka (JP); Yuji Kitano, Tokyo (JP); Yo Imaizumi, Tokyo (JP); Makoto Souma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/841,860

(22) Filed: Apr. 7, 2020

(65) Prior Publication Data

US 2020/0333737 A1 Oct. 22, 2020

(30) Foreign Application Priority Data

Apr. 19, 2019 (JP) .................................. 2019-080421

(51) Int. Cl.
*G03G 15/20* (2006.01)
*C08L 83/04* (2006.01)
(Continued)

(52) U.S. Cl.
CPC ........... *G03G 15/2057* (2013.01); *C08K 3/14* (2013.01); *C08K 3/22* (2013.01); *C08L 83/04* (2013.01); *G03G 15/0291* (2013.01); *G03G 15/2064* (2013.01); *C08K 2003/222* (2013.01); *C08K 2003/2227* (2013.01);
(Continued)

(58) Field of Classification Search
None
See application file for complete search history.

(56) References Cited

U.S. PATENT DOCUMENTS 4,702,964 A 10/1987 Hirano et al.
5,291,257 A 3/1994 Cerrah et al.
(Continued)

FOREIGN PATENT DOCUMENTS

JP 61-39074 A 2/1986
JP 7-152274 A 6/1995
(Continued)

OTHER PUBLICATIONS

Extended European Search Report in European Application No. 20169794.3 (dated Sep. 24, 2020).

*Primary Examiner* — Roy Y Yi

(74) *Attorney, Agent, or Firm* — Venable LLP

(57) ABSTRACT

Provided is a fixing member having excellent heat resistance and durability. The fixing member includes a substrate and an elastic layer on the substrate, wherein the elastic layer includes: rubber, thermally conductive particles dispersed in the rubber, and iron oxide particles dispersed in the rubber, a content of the thermally conductive particles in the elastic layer is 30% by volume or more and 50% by volume or less, a content of the iron oxide particles in the elastic layer is 0.01% by volume or more and 1.0% by volume or less, the thermally conductive particles are at least one selected from the group consisting of aluminum oxide, metal silicon, magnesium oxide, zinc oxide, and silicon carbide, and the iron oxide particles have a localization index M of 0.2 or more and less than 0.8, wherein the localization index M is determined by specific steps.

13 Claims, 11 Drawing Sheets

(51) Int. Cl.
  *C08K 3/22* (2006.01)
  *C08K 3/14* (2006.01)
  *G03G 15/02* (2006.01)

(52) U.S. Cl.
  CPC ............ *C08K 2003/2265* (2013.01); *C08K 2003/2296* (2013.01); *C08K 2201/001* (2013.01); *G03G 2215/2016* (2013.01); *G03G 2215/2051* (2013.01)

(56) References Cited

U.S. PATENT DOCUMENTS

| | | |
|---|---|---|
| 10,203,639 B2 | 2/2019 | Meguriya et al. |
| 10,545,439 B2 | 1/2020 | Matsumoto et al. |
| 2012/0161066 A1 | 6/2012 | Hirabayashi et al. |
| 2019/0377285 A1 | 12/2019 | Matsumoto et al. |
| 2019/0377290 A1 | 12/2019 | Kitano et al. |
| 2019/0377291 A1 | 12/2019 | Maeda et al. |

FOREIGN PATENT DOCUMENTS

| | | |
|---|---|---|
| JP | 2002-268423 A | 9/2002 |
| JP | 2011-028252 A | 2/2011 |
| JP | 2016-102881 A | 6/2016 |

FIG. 1A
FIG. 1B
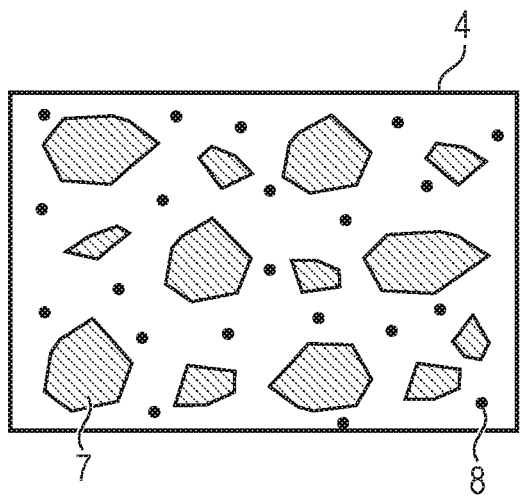
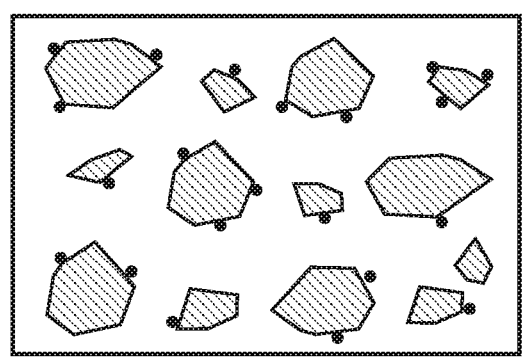

FIXING MEMBER AND HEAT FIXING DEVICE

BACKGROUND OF THE INVENTION

Field of the Invention

The present disclosure relates to a fixing member used in a heat fixing device of an electrophotographic image forming apparatus, and a heat fixing device.

Description of the Related Art

In a heat fixing device of an electrophotographic image forming apparatus, a press contact unit is constituted by a heating member and a pressure member disposed to face the heating member. When a material to be recorded which retains an unfixed toner image is introduced into the press contact unit, an unfixed toner is melted by heating and pressing, and the image is fixed on the material to be recorded.

The heating member is a member in contact with the unfixed toner image on the material to be recorded, and the pressure member is a member disposed to face the heating member. Examples of the shape of the fixing member include a rotatable member having a roller shape or an endless belt shape. As these fixing members, a member having an elastic layer containing a rubber such as a cross-linked silicone rubber and thermally conductive particles on a substrate formed of a metal, a heat-resistant resin, or the like is used.

In recent years, a print speed is getting faster and device downsizing has been increased, and accordingly, it has been required to further improve durability of the elastic layer of the fixing member. One of the durability requirements for the elastic layer is heat resistance and durability. Since the elastic layer is repeatedly elastically deformed under a heating environment, rubber in the elastic layer may be gradually deteriorated and softened, resulting in being broken.

Japanese Patent Application Laid-Open No. 2011-028252 discloses a silicone rubber composition for a fixing belt in which iron oxide particles are blended in addition to thermally conductive particles, to improve heat resistance and durability.

SUMMARY OF THE INVENTION

An embodiment of the present disclosure is directed to providing a fixing member having further improved heat resistance. Another embodiment of the present disclosure is directed to providing a heat fixing device having excellent durability.

According to an embodiment of the present disclosure, there is provided a fixing member including
a substrate, and
an elastic layer on the substrate,
wherein
the elastic layer includes:
rubber,
thermally conductive particles dispersed in the rubber, and
iron oxide particles dispersed in the rubber,
a content of the thermally conductive particles in the elastic layer is 30% by volume or more and 50% by volume or less,
a content of the iron oxide particles in the elastic layer is 0.01% by volume or more and 1.0% by volume or less,
the thermally conductive particles are
at least one selected from the group consisting of aluminum oxide, metal silicon, magnesium oxide, zinc oxide, and silicon carbide, and
the iron oxide particles have a localization index M of 0.2 or more and less than 0.8, wherein the localization index M is determined by the following steps (i) to (v):
(i) a step of obtaining an image of a rectangle area of 40 μm in length and 59 μm in width placed at an arbitrary position in a cross section in a thickness direction of the elastic layer, the image having a resolution of 682 pixels in length and 1024 pixels in width, and determining center-of-gravity coordinates of the iron oxide particles present in the image;
(ii) a step of creating a Euclidean distance map showing a distance from each of points corresponding to pixels other than pixels showing the thermally conductive particles among pixels in the image, to outer surfaces of the thermally conductive particles closest to each of the points;
(iii) a step of obtaining a cumulative relative frequency distribution Ga of a distance from each of the center-of-gravity coordinates of each of the iron oxide particles to the outer surface of the thermally conductive particles closest to each of the center-of-gravity coordinates of each of the iron oxide particles, with a section length of 0.1 μm, referring to the center-of-gravity coordinates of each of the iron oxide particles and the Euclidean distance map;
(iv) a step of obtaining a cumulative relative frequency distribution Gr of a distance from each of points corresponding to the pixels other than the pixels displaying the thermally conductive particles in the image to the outer surface of the thermally conductive particles closest to each of the points, with a section length of 0.1 μm, referring to the Euclidean distance map; and
(v) a step of, subtracting a value of the number of the cumulative relative frequency distribution Gr from a value of the number of the cumulative relative frequency distribution Ga to determine a difference, for each of sections in a distance from the outer surface of the thermally conductive particles is up to 0.5 μm, and dividing a sum of the differences for each of the section by the number of sections, i.e. 5, to obtain an average value, which is defined as the localization index M.

According to another embodiment of the present disclosure, there is provided a heat fixing device including a heating member and a pressure member disposed to face the heating member, wherein the heating member is the fixing member described above.

Further features of the present disclosure will become apparent from the following description of exemplary embodiments with reference to the attached drawings.

BRIEF DESCRIPTION OF THE DRAWINGS

FIGS. 1A and 1B are illustrations of a dispersion state of thermally conductive particles and iron oxide particles in an elastic layer of a fixing member according to an embodiment of the present disclosure.

DESCRIPTION OF THE EMBODIMENTS

Figure 2A:
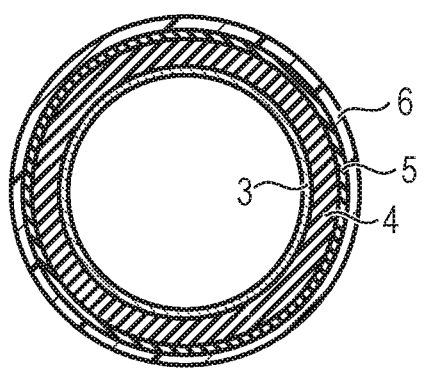
FIGS. 2A and 2B are outline cross-sectional views of the fixing member according to an embodiment of the present disclosure.

According to the study of the present inventors, an elastic layer formed using the silicone rubber composition for a fixing belt according to Japanese Patent Application Laid-Open No. 2011-028252 did not have sufficient heat resistance yet. Further, an increase in a blending amount of iron oxide particles in the silicone rubber composition contributed to heat resistance improvement of a silicone rubber after curing, but sometimes, caused a decrease in flexibility of the silicone rubber and an increase in viscosity of the silicone rubber composition resulting in reduction of moldability.

Therefore, the present inventors have developed a technology for promoting improvement of heat resistance and durability of the elastic layer, regardless of the increase of the blending amount of the iron oxide particles which causes a decrease in flexibility and moldability of the elastic layer of the fixing member. As a result, the present inventors have found that the above object can be achieved well, by localizing the iron oxide particles in the vicinity of thermally conductive particles in the elastic layer.

A fixing member according to an embodiment of the present disclosure includes a substrate, and an elastic layer on the substrate.

The elastic layer includes rubber, thermally conductive particles dispersed in the rubber, and iron oxide particles dispersed in the rubber.

A content of the thermally conductive particles in the elastic layer is 30% by volume or more and 50% by volume or less, and a content of the iron oxide particles in the elastic layer is 0.01% by volume or more and 1.0% by volume or less.

The thermally conductive particles are at least one selected from the group consisting of aluminum oxide, metal silicon, magnesium oxide, zinc oxide, and silicon carbide. Further, the iron oxide particles have a localization index M of 0.2 or more and less than 0.8, wherein the localization index M is determined by the following steps (i) to (v):

(i) obtaining an image of a rectangle area of 40 μm in length and 59 μm in width placed at an arbitrary position in a cross section in a thickness direction of the elastic layer, the image having a resolution of 682 pixels in length and 1024 pixels in width, and determining center-of-gravity coordinates of the iron oxide particles present in the image;

(ii) creating a Euclidean distance map showing a distance from each of points corresponding to pixels other than pixels showing the thermally conductive particles among pixels in the image, to outer surfaces of the thermally conductive particles closest to each of the points;

(iii) obtaining a cumulative relative frequency distribution Ga of a distance from each of the center-of-gravity coordinates of each of the iron oxide particles to the outer surface of the thermally conductive particles closest to each of the center-of-gravity coordinates of each of the iron oxide particles, with a section length of 0.1 μm, referring to the center-of-gravity coordinates of each of the iron oxide particles and the Euclidean distance map;

(iv) obtaining a cumulative relative frequency distribution Gr of a distance from each of points corresponding to the pixels other than the pixels showing the thermally conductive particles in the image to the outer surface of the thermally conductive particles closest to each of the points, with a section length of 0.1 μm, referring to the Euclidean distance map; and (v) subtracting a value of the number of the cumulative relative frequency distribution Gr from a value of the number of the cumulative relative frequency distribution Ga to determine a difference, for each of sections in a distance from the outer surface of the thermally conductive particles is up to 0.5 μm, and dividing a sum of the differences for each of the section by the number of sections, i.e. 5, to obtain an average value, which is defined as the localization index M.

As illustrated in FIGS. 1A and 1B, iron oxide particles 8 are localized in the vicinity of thermally conductive particles 7 in an elastic layer 4, thereby improving the heat resistance and durability of the elastic layer. The mechanism is presumed as follows.

One of the main factors of softening of rubber due to the deterioration thereof constituting the elastic layer 4 includes deterioration due to impurities such as alkali and alkaline earth metal ions diffused from the thermally conductive particles 7. The bond of the rubber is broken by these impurities, whereby the rubber is softened.

The iron oxide particles 8 are considered to have an effect of suppressing softening due to deterioration, by trapping these impurities. Therefore, it is considered that by localizing the iron oxide particles 8 in the vicinity of the thermally conductive particles 7 which are a source of the impurities, the impurities can be more efficiently trapped, and the softening due to the deterioration of the rubber can be further suppressed.

A fixing member according to an embodiment of the present disclosure and a heat fixing device according to another embodiment of the present disclosure will be described in detail below, based on a specific configuration.

(1) Outline of Configuration of Fixing Member

Details of the fixing member according to an embodiment of the present disclosure will be described with reference to the drawings.

The fixing member according to an embodiment of the present disclosure may be a heating member or a pressure member, for example, a rotatable member such as that having a roller shape or an endless belt shape (hereinafter, also referred to as a "fixing roller" and a "fixing belt", respectively). The fixing belt according to the present disclosure includes a fixing film.

Figure 2B:
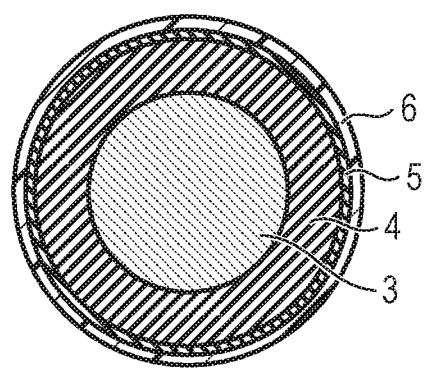

FIG. 2A is a cross-sectional view of the fixing belt in a circumferential direction, and FIG. 2B is a cross-sectional view of the fixing roller in the circumferential direction. As illustrated in FIGS. 2A and 2B, the fixing member has a substrate 3, an elastic layer 4 on an outer surface of the substrate 3, and a surface layer (release layer) 6 on an outer surface of the elastic layer 4. Further, an adhesive layer 5 may be provided between the elastic layer 4 and the surface layer 6, and in this case, the surface layer 6 is fixed to an outer circumference surface of the elastic layer 4 by the adhesive layer 5.

(2) Substrate

The material of the substrate is not particularly limited, but a material known in the field of the fixing member can be appropriately used. Examples of the material constituting the substrate include metals such as aluminum, iron, nickel, and copper, alloys such as stainless steel, and resins such as polyimide.

Here, when the heat fixing device is a heat fixing device which heats a substrate by an induction heating method as a heating unit of the fixing member, the substrate is constituted by at least one metal selected from the group consisting of nickel, copper, iron, and aluminum. Among them, an alloy containing nickel or iron as a main component is preferably used from the viewpoint of heat generation efficiency. In addition, the main component means a most contained component, among components constituting an object (here, the substrate).

The shape of the substrate can be appropriately selected according to the shape of the fixing member, and for example, may be various shapes such as an endless belt shape, a hollow cylindrical shape, a solid columnar shape, and a film shape.

In the case of a fixing belt, it is preferred that a thickness of the substrate is, for example, 15 µm or more and 80 µm or less. When the thickness of the substrate is within the above range, both strength and flexibility can be achieved at a high level. Further, for example, when an inner circumference surface of the fixing belt is in contact with another member, in order to prevent wear of the inner circumference surface of the fixing belt, a layer for improving slidability with other members may be provided on the surface of the substrate on the opposite side to a side facing the elastic layer.

The surface of the substrate on the side facing the elastic layer may be subjected to a surface treatment for imparting a function such as adhesion to the elastic layer. Examples of the surface treatment include, for example, physical treatment such as blast treatment, lapping treatment, and polishing, and chemical treatment such as oxidation treatment, coupling agent treatment, and primer treatment. Further, physical treatment and chemical treatment may be used in combination.

In particular, when an elastic layer including a crosslinked silicone rubber is used, it is preferred to treat the outer surface of the substrate with a primer, for improving close adhesion between the substrate and the elastic layer. As the primer, for example, a primer in a paint state in which an additive is appropriately blended in an organic solvent and dispersed can be used. Such primers may be commercially available primers. Examples of the additive include a silane coupling agent, a silicone polymer, methylsiloxane hydride, alkoxysilane, a catalyst for promoting a reaction such as hydrolysis, condensation, and addition, and a coloring agent such as iron oxide. The primer treatment is carried out by applying the primer to the outer surface of the substrate, and going through a drying and baking process.

The primer can be appropriately selected depending on, for example, the material of the substrate, the kind of the elastic layer, the reaction type at the time of crosslinking, and the like. For example, when the material constituting the elastic layer contains a large amount of unsaturated aliphatic groups, a material containing a hydrosilyl group is preferably used as a primer, for imparting adhesion by the reaction with the unsaturated aliphatic groups. When the material constituting the elastic layer contains a large amount of a hydrosilyl group, on the contrary, a material containing an unsaturated aliphatic group is preferably used as the primer. In addition, the primer can be appropriately selected depending on the kind of the substrate and the elastic layer which are an adhered, such as a material containing an alkoxy group.

(3) Elastic Layer

The elastic layer is a layer for imparting flexibility to the fixing member for securing a nip in the heat fixing device. When the fixing member is used as a heating member in contact with toner on the paper, the elastic layer also functions as a layer for imparting flexibility so that the surface of the fixing member can follow the irregularities of the paper.

The elastic layer includes a rubber as a matrix and particles dispersed in the rubber. More specifically, the elastic layer includes a rubber, thermally conductive particles, and iron oxide particles, and is composed of a cured product obtained by curing a composition including at least a raw material of rubber (a base polymer, a crosslinking agent, and the like), thermally conductive particles, and iron oxide particles.

From the viewpoint of expressing the function of the elastic layer described above, the elastic layer is preferably composed of a cured silicone rubber including thermally conductive particles, and is more preferably composed of a cured product of an addition-curable silicone rubber composition.

The silicone rubber composition can include, for example, thermally conductive particles, iron oxide particles, a base polymer, a crosslinking agent, and a catalyst, and, if necessary, an additive. Since the silicone rubber composition is often in a liquid state, the thermally conductive particles are easily dispersed, and the elasticity of the elastic layer to be produced is easily adjusted by adjusting the crosslinking degree depending on the kind and the addition amount of thermally conductive particles, which is thus preferred.

When the fixing member according to the present disclosure is a fixing belt, it is preferred that a thickness of the elastic layer is, for example, 200 µm or more and 500 µm or less.

(3-1) Matrix

The matrix has a function of expressing elasticity in the elastic layer. It is preferred that the matrix includes a silicone rubber, from the viewpoint of expressing the function of the elastic layer described above. The silicone rubber has high heat resistance so that it can maintain flexibility even in a high temperature environment at about 240° C. in a non-paper passing area, which is thus preferred. As the silicone rubber, for example, a cured product of an addition-curable liquid silicone rubber described later (hereinafter, also referred to as "cured silicone rubber") can be used.

(3-1-1) Addition-Curable Liquid Silicone Rubber

The addition-curable liquid silicone rubber usually includes the following components (a) to (c):

component (a): an organopolysiloxane having an unsaturated aliphatic group;

component (b): an organopolysiloxane having active hydrogen bonded to silicon;

component (c): a catalyst.

Hereinafter, each component will be described in detail.

(3-1-2) Component (a)

The organopolysiloxane having an unsaturated aliphatic group is an organopolysiloxane having an unsaturated aliphatic group such as a vinyl group, and examples thereof include organopolysiloxanes represented by the following Structural Formulae (1) and (2).

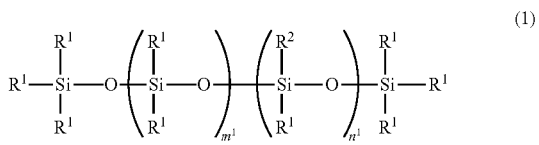

(1)

In Structural Formula (1), $m^1$ represents an integer of 0 or more, and $n^1$ represents an integer of 3 or more. Further, in Structural Formula (1), $R^1$ independently of each other represents a monovalent unsubstituted or substituted hydrocarbon group containing no unsaturated aliphatic group, provided that at least one of $R^1$ represents a methyl group, and $R^2$ independently of each other represents an unsaturated aliphatic group.

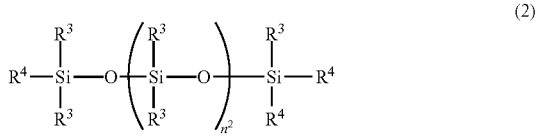

(2)

In Structural Formula (2), $n^2$ represents a positive integer, $R^3$ independently of each other represents a monovalent unsubstituted or substituted hydrocarbon group containing no unsaturated aliphatic group, provided that at least one of $R^3$ represents a methyl group, and $R^4$ independently of each other represents an unsaturated aliphatic group.

In Structural Formula (1) and Structural Formula (2), examples of the monovalent unsubstituted or substituted hydrocarbon group containing no unsaturated aliphatic group, which can be represented by $R^1$ and $R^3$, include the following groups.

Unsubstituted Hydrocarbon Groups:
alkyl groups (for example, a methyl group, an ethyl group, a propyl group, a butyl group, a pentyl group, and a hexyl group);
aryl groups (for example, a phenyl group).

Substituted Hydrocarbon Groups:
substituted alkyl groups (for example, a chloromethyl group, a 3-chloropropyl group, a 3,3,3-trifluoropropyl group, a 3-cyanopropyl group, and a 3-methoxypropyl group).

The organopolysiloxane represented by Structural Formulae (1) and (2) has at least one methyl group directly bonded to a silicon atom forming a chain structure. However, for ease of synthesis and handling, it is preferred that 50% or more of each of $R^1$ and $R^3$ is a methyl group, and it is more preferred that all $R^1$ and $R^3$ are a methyl group.

In Structural Formulae (1) and (2), examples of the unsaturated aliphatic group represented by $R^2$ and $R^4$ include the following groups. That is, examples of the unsaturated aliphatic group include a vinyl group, an allyl group, a 3-butenyl group, a 4-pentenyl group, a 5-hexenyl group, and the like. Among these groups, it is preferred that both $R^2$ and $R^4$ are a vinyl group, since synthesis and handling are easy and inexpensive and the crosslinking reaction is easily performed.

The viscosity of component (a) is preferably 100 mm$^2$/s or more and 50,000 mm$^2$/s or less, from the viewpoint of moldability. The viscosity (dynamic viscosity) can be measured using a capillary viscometer, a rotational viscometer, or the like, based on JIS Z 8803: 2011.

A blending amount of component (a) is preferably 40% by volume or more from the viewpoint of pressure resistance, and 70% by volume or less from the viewpoint of a heat transfer property, based on the liquid silicone rubber composition used for forming the elastic layer.

(3-1-3) Component (b)

The organopolysiloxane having active hydrogen bonded to silicon reacts with the unsaturated aliphatic group of component (a) by the action of a catalyst, to function as a crosslinking agent for forming a cured silicone rubber.

As component (b), any organopolysiloxane can be used, as long as it has a Si—H bond. In particular, from the viewpoint of reactivity with the unsaturated aliphatic group of component (a), an organopolysiloxane having an average of three or more hydrogen atoms bonded to silicon atoms in one molecule is preferably used.

Specific examples of component (b) include a linear organopolysiloxane represented by the following Structural Formula (3) and a cyclic organopolysiloxane represented by the following Structural Formula (4).

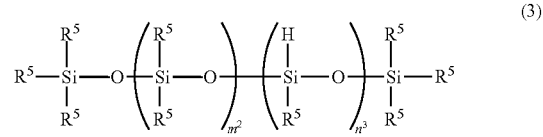

(3)

In Structural Formula (3), $m^2$ represents an integer of 0 or more, $n^3$ represents an integer of 3 or more, and $R^5$ independently of each other represents a monovalent unsubstituted or substituted hydrocarbon group containing no unsaturated aliphatic group.

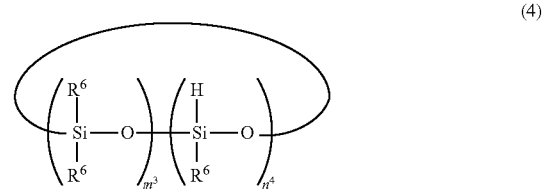

(4)

In Structural Formula (4), $m^3$ represents an integer of 0 or more, $n^4$ represents an integer of 3 or more, and $R^6$ independently of each other represents a monovalent unsubstituted or substituted hydrocarbon group containing no unsaturated aliphatic group.

Examples of the monovalent unsubstituted or substituted hydrocarbon group containing no unsaturated aliphatic group, which can be represented by $R^5$ and $R^6$ in Structural Formulae (3) and (4), include the same group as $R^1$ in Structural Formula (1) described above. Among these, for ease of synthesis and handling, and easy obtainment of excellent heat resistance, it is preferred that 50% or more of each of $R^5$ and $R^6$ is a methyl group, and it is more preferred that all $R^5$ and $R^6$ are a methyl group.

(3-1-4) Component (c)

Examples of the catalyst used for forming the silicone rubber include a hydrosilylation catalyst for accelerating a curing reaction. As the hydrosilylation catalyst, for example, known substances such as a platinum compound and a rhodium compound can be used. A blending amount of the catalyst can be appropriately set and is not particularly limited.

(3-2) Thermally Conductive Particles

The thermally conductive particles are selected in consideration of heat conductivity, specific heat capacity, density, particle size and the like of their own. Examples of the thermally conductive particles used for the purpose of improving the heat transfer property of inorganic materials, particularly metals, metal compounds, and the like, include the following, and a plurality of kinds may be combined: aluminum oxide, metal silicon, magnesium oxide, zinc oxide, and silicon carbide.

The thermally conductive particles may be subjected to a surface treatment, from the viewpoint of affinity for silicone rubber. Specifically, thermally conductive particles are surface-treated with a silane coupling agent, hexamethyldisilazane, a silicone oligomer, or the like, having an active group such as a hydroxyl group on the surface of particles such as aluminum oxide and magnesium oxide. The metal filler is subjected to a surface treatment by forming an oxide film.

It is preferred that a blending amount of the thermally conductive particles in the elastic layer is 30% or more and 50% or less, as a volume blending ratio of the thermally conductive particles with respect to the volume of the elastic layer. When the volume blending ratio of the thermally conductive particles is 30% or more, the elastic layer is expected to have a higher thermal conductivity, and when the volume blending ratio is 50% or less, a low hardness of the elastic layer can be secured.

A particle size of the thermally conductive particles is preferably 1 µm or more and 100 µm or less, and more preferably 3 µm or more and 30 µm or less. The particle size here refers to a volume average particle size.

(3-3) Iron Oxide Particles

The kind of iron oxide particles may be either of iron oxide (II) and iron oxide (III), or a mixture thereof. A surface treatment may be performed, from the viewpoint of affinity for a silicone rubber. Specifically, the surface treatment is performed with a silane coupling agent, hexamethyldisilazane, a silicone oligomer, or the like.

It is preferred that a blending amount of the iron oxide particles in the elastic layer is 0.01% or more and 1.0% or less, as the volume ratio of the iron oxide particles with respect to the volume of the elastic layer. When the volume ratio of the iron oxide particles is 0.01% or more, a sufficient heat resistance improvement effect can be obtained, and when the volume ratio is 1.0% or less, deterioration in moldability due to an increase in viscosity of the rubber composition can be suppressed.

The shape of the iron oxide particles is not particularly limited, and may be any one of a spherical shape, a crushed shape, and an irregular shape, but for the particle size, the average particle size of the iron oxide particles may be preferably in a range of 0.01 µm or more and 0.50 µm or less. When the average particle size is 0.01 µm or more, deterioration in moldability due to the increase in viscosity of the rubber composition can be suppressed, and when the average particle size is 0.50 µm or less, a sufficient heat resistance improvement effect can be obtained. The particle size herein also refers to the volume average particle size.

(3-4)

The composition of the cured silicone rubber in the elastic layer can be confirmed by performing total reflection (ATR) measurement using an infrared spectrometer (FT-IR) (for example, trade name: Frontier FT IR, manufactured by PerkinElmer, Inc.). The silicon-oxygen bond (Si—O), which is a main chain structure of silicone, shows strong infrared absorption near a wave number of 1020 cm$^{-1}$ due to stretching vibration. Furthermore, since a methyl group (Si—CH$_3$) bonded to a silicon atom shows strong infrared absorption near a wave number of 1260 cm$^{-1}$ due to the deformation vibration caused by its structure, the existence thereof can be confirmed.

The contents of the cured silicone rubber, the thermally conductive particles, and the iron oxide particles in the elastic layer can be confirmed using a thermogravimetric apparatus (TGA) (for example, trade name: TGA851, manufactured by Mettler-Toledo). The elastic layer is cutout with a razor or the like, and about 20 mg is accurately weighed and placed in an alumina pan used in the apparatus. The alumina pan containing the sample is set in the apparatus, heated from room temperature to 800° C. at a heating rate of 20° C./min, and allowed to stand at 800° C. for 1 hour. In a nitrogen atmosphere, as the temperature rises, the cured silicone rubber component is decomposed and removed by cracking without being oxidized, and thus, the weight of the sample is decreased. By comparing the weights before and after the measurement as such, the content of the cured silicone rubber component and the contents of the thermally conductive particles and the iron oxide particles contained in the elastic layer can be confirmed.

Further, by performing energy dispersive X-ray analysis (EDS) (for example, trade name: X-MAXN80, manufactured by OXFORD) on the cross section of the elastic layer, the components of thermally conductive particles and iron oxide particles can be identified.

(4) Adhesive Layer

The adhesive layer is a layer for bonding the elastic layer and the surface layer. An adhesive used in the adhesive layer can be appropriately selected from known adhesives and used, and is not particularly limited. However, from the viewpoint of ease of handling, it is preferred to use an addition-curable silicone rubber blended with a self-adhesive component.

The adhesive can include, for example, a self-adhesive component, an organopolysiloxane having a plurality of unsaturated aliphatic groups represented by a vinyl group in a molecular chain, a hydrogen organopolysiloxane, and a platinum compound as a crosslinking catalyst. The adhesive applied to the surface of the elastic layer can be cured by an addition reaction, thereby forming the adhesive layer for bonding the surface layer to the elastic layer.

In addition, examples of the self-adhesive component include the following:

silane having at least one, preferably two or more functional groups selected from the group consisting of an alkenyl group such as a vinyl group, a (meth)acryloxy group, a hydrosilyl group (SiH group), an epoxy group, an alkoxysilyl group, a carbonyl group, and a phenyl group;

an organosilicon compound such as a cyclic or linear siloxane having 2 or more and 30 or less silicon atoms, preferably 4 or more and 20 or less silicon atoms; and a non-silicon-based (i.e., containing no silicon atom in the molecule) organic compound which may contain an oxygen atom in the molecule. However, one or more and four or less, preferably one or more and two or less or monovalent or more and tetravalent or less, preferably divalent or more and tetravalent or less aromatic rings having a phenylene structure or the like are contained in one molecule. Further, at least one, preferably two or more and four or less functional groups (for example, an alkenyl group and a (meth)acryloxy group) which can contribute to the hydrosilylation addition reaction can be contained in one molecule.

One of the above self-adhesive components may be used alone or in combination of two or more. In addition, a filler component can be added to the adhesive within a range consistent with the purpose of the present disclosure, from the viewpoint of adjusting viscosity and securing heat resistance. Examples of the filler component include the following: silica, alumina, iron oxide, cerium oxide, cerium hydroxide, carbon black, and the like.

A blending amount of each component contained in the adhesive is not particularly limited, and can be appropriately set. Such an addition-curable silicone rubber adhesive is also commercially available and can be easily obtained. It is preferred that a thickness of the adhesive layer is 20 μm or less. When the thickness of the adhesive layer is 20 μm or less, in the case in which the fixing belt according to the present embodiment is used in a heat fixing device as a heating belt, a thermal resistance can be easily set small, and heat from an inner surface side can be efficiently transferred to a recording medium.

(5) Surface Layer

It is preferred that the fixing member has a surface layer provided directly or via the adhesive layer on the surface of the elastic layer on the opposite side to the surface on the side facing the substrate.

The surface layer exhibits a function as a release layer for preventing toner from adhering to an outer surface of the fixing member, and preferably contains a fluorine resin. For forming the surface layer, for example, a resin exemplified below can be used after being molded into a tube shape:

a tetrafluoroethylene-perfluoro(alkyl vinyl ether) copolymer (PFA), polytetrafluoroethylene (PTFE), a tetrafluoroethylene-hexafluoropropylene copolymer (FEP), and the like.

Among the resin materials exemplified above, PFA is particularly preferably used, from the viewpoint of moldability and toner releasability.

A thickness of the surface layer is preferably 10 μm or more and 50 μm or less. When the thickness of the surface layer is within the range, it is easy to maintain an appropriate surface hardness of the fixing member.

(6) Method of Producing Fixing Member

The fixing member according to the present embodiment can be produced by, for example, a production method including the following steps.

(6-1) Step of Preparing Substrate

First, a substrate composed of the above-mentioned material is prepared. The shape of the substrate can be appropriately set as described above, and may be, for example, an endless belt shape. On an inner surface of the substrate, layers for imparting various functions such as heat insulation and slidability to the fixing member can be appropriately formed, and a surface treatment can be performed on an outer surface of the substrate, for imparting various functions such as adhesion to the substrate.

(6-2) Step of Forming Elastic Layer

The step of forming the elastic layer can include the following steps:

(i) a step of preparing a composition for an elastic layer including thermally conductive particles, iron oxide particles, and a raw material of silicone rubber (for example, a base polymer, a crosslinking agent, and a catalyst) (a step of preparing a composition for an elastic layer);

(ii) a step of forming a layer including the composition on a substrate (a step of forming a composition layer), the composition is applied to the substrate by a method such as a mold forming method, a blade coating method, a nozzle coating method, and a ring coating method to form a layer of the composition;

(iii) a step of curing the composition layer to form an elastic layer (a curing step).

(6-3) Step of Localizing Iron Oxide Particles in the Vicinity of Thermally Conductive Particles Examples of a method of localizing the iron oxide particles in the vicinity of the thermally conductive particles include a method of mixing the iron oxide particles and the thermally conductive particles with each other in advance in the form of a powder, before the step of preparing the composition for an elastic layer, to adhere the iron oxide particles to the surface of the thermally conductive particles. Further, a method of applying an external field such as an electric field or a magnetic field in the state in which the composition layer is in an uncured state, after the step of forming the composition layer, thereby attracting the iron oxide particles to the thermally conductive particles, is included. Hereinafter, each method will be described in detail.

(6-3-1) Premixing of Thermally Conductive Particles and Iron Oxide Particles

When the thermally conductive particles and the iron oxide particles are mixed with the raw material of silicone rubber to prepare the composition for an elastic layer, the particles are uniformly dispersed and the iron oxide particles are not localized in the vicinity of the thermally conductive particles.

The iron oxide particles can be localized in the vicinity of the thermally conductive particles, by mixing the thermally conductive particles and the iron oxide particles in advance between the powders to adhere the iron oxide particles to the surface of the thermally conductive particles, and then mixing the particles with the raw material of silicone rubber.

As a method of mixing the powders, a container rotation type dry mixer such as a rocking mixer may be used, or a stirring blade type dry mixer such as a super mixer or a Henschel mixer may be used.

When using a stirring blade type dry mixer, it is preferred to stir at a relatively low speed for a long time so as not to apply too much shearing force.

It is preferred that the thermally conductive particles and the iron oxide particles are treated with the same type of surface treatment agent so that both kinds of particles are adhered effectively. The affinity of the both kinds of particles is improved and the particles are effectively adhered, by treating with the same type of surface treatment agent.

(6-3-2) Localization of Iron Oxide Particles by Electric Field

After the step of forming the composition layer including the thermally conductive particles, the iron oxide particles, and the raw material of the silicone rubber, an electric field is applied in the state in which the composition layer is in an uncured state, thereby localizing the iron oxide particles in the vicinity of the thermally conductive particles.

When an electric field is applied to the composition, the thermally conductive particles and the iron oxide particles cause dielectric polarization, so that an interaction occurs by electrostatic attraction, and the iron oxide particles having a smaller diameter are attracted to the thermally conductive particles.

As an embodiment in which the iron oxide particles are localized in the vicinity of the thermally conductive particles, a method of using a corona charger will be described. The corona charging method includes a scorotron method having a grid electrode between a corona wire and an object to be charged, and a corotron method having no grid electrode, and from the viewpoint of controllability of a surface potential of the object to be charged, a scorotron method is preferred.

Figure 3A:
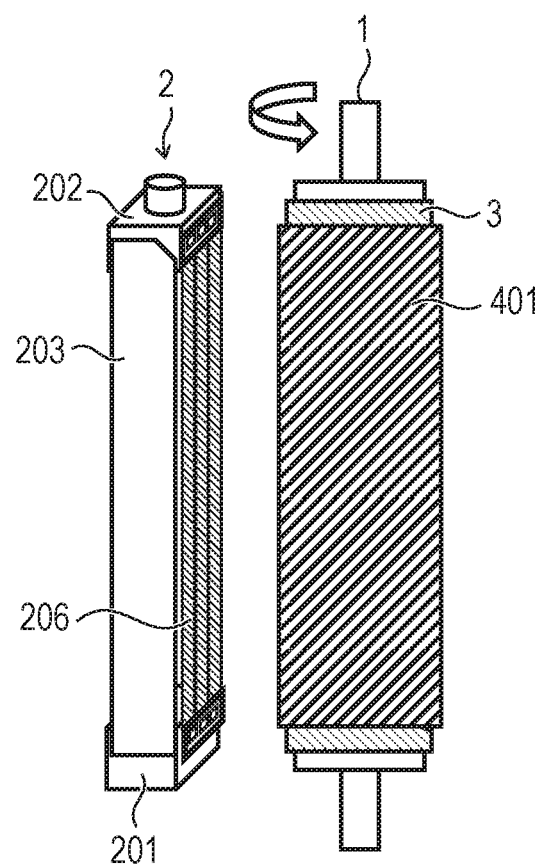
FIG. 3A is an overhead view of a corona charger.
Figure 3B:
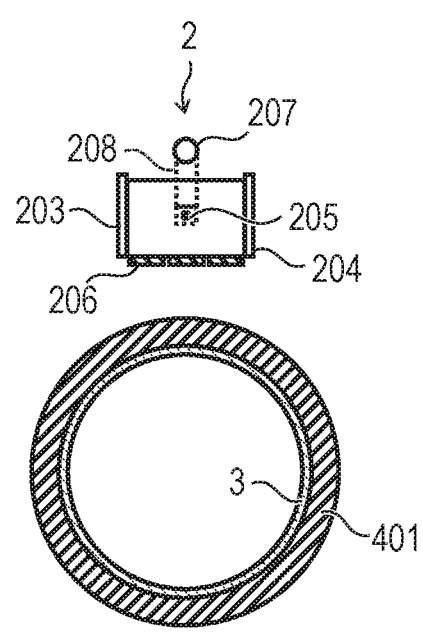
FIG. 3B is a cross-sectional view of a corona charger.

FIG. 3A is an overhead view of the corona charger, and FIG. 3B is a cross-sectional view of the corona charger. A corona charger 2 includes blocks 201 and 202, shields 203 and 204, and a grid 206, as illustrated in FIGS. 3A and 3B. Further, a discharge wire 205 is stretched between the block 201 and the block 202. A high voltage is applied to the discharge wire 205 by a high-voltage power supply (not shown), and an ion current obtained by discharge to the shields 203 and 204 is controlled by applying a high voltage to the grid 206, thereby charging the surface of the composition layer. At this time, since a substrate 3 or a core 1 holding the substrate 3 is grounded (not shown), it is possible to generate a desired electric field in the composition layer by controlling the surface potential of the composition layer.

As illustrated in FIG. 3A, the corona charger 2 is disposed so as to be close to and face a composition layer 401 along a width direction of the composition layer 401. Then, a voltage is applied to the grid 206 of the corona charger 2, the core 1 is rotated in the state of being discharged, and the substrate 3 having the composition layer 401 on an outer circumference surface is rotated, for example, at 100 rpm for 20 seconds, thereby charging an outer surface of the composition layer 401. A distance between the outer surface of the composition layer 401 and the grid 206 can be 1 mm or more and 10 mm or less. Thus, the surface of the composition layer is charged to generate an electric field in the composition layer. As a result, the iron oxide particles can be localized in the vicinity of the thermally conductive particles.

The voltage applied to the grid 206 is preferably in a range of 0.3 kV or more and 3 kV or less, and particularly, 0.6 kV or more and 2 kV or less as an absolute value, in terms of generating an effective electrostatic interaction between the thermally conductive particles and the iron oxide particles. If a sign of the voltage to be applied is equal to a sign of the voltage applied to the wire, a direction of the electric field becomes reversed whether it is negative or positive, but the effect obtained is the same, and alternating current may be applied.

It is preferred that a range of potential control in a longitudinal direction of the surface of the composition layer is preferably equal to or larger than a paper passing area of the fixing member. For example, the configuration illustrated in FIG. 3A can be used, and while a voltage is applied to the grid 206, a central axis of the substrate having the composition layer 401 is rotated as a rotation axis, whereby it is possible to charge the entire composition layer. In addition, it is preferred that the number of rotations of the fixing belt is 10 rpm or more and 500 rpm or less, and the processing time is 5 seconds or more.

For the discharge wire 205, a material such as stainless steel, nickel, molybdenum, or tungsten can be used as appropriate, but it is preferred to use tungsten, which is extremely stable among metals.

The shape of the discharge wire 205 stretched inside the shields 203 and 204 is not particularly limited, and for example, a discharge wire having a shape like a saw tooth, or a discharge wire having a cross-sectional shape being round when the discharge wire is cut vertically (circular cross-sectional shape), can be used.

The diameter of the discharge wire 205 (in the cut surface when cut perpendicular to the wire) is preferably 40 μm or more and 100 μm or less. When the diameter of the discharge wire 205 is 40 μm or more, it is possible to easily prevent the discharge wire from being cut or broken by collision of ions due to discharge. Further, when the diameter of the discharge wire 205 is 100 μm or less, in the case in which a stable corona discharge is obtained, an appropriate applied voltage can be applied to the discharge wire 205, and the generation of ozone can be easily prevented.

As illustrated in FIG. 3B, the flat grid 206 can be disposed between the discharge wire 205 and the composition layer 401 disposed on the substrate 3. Here, it is preferred that the distance between the surface of the composition layer 401 and the grid 206 is in a range of 1 mm or more and 10 mm or less, from the viewpoint of making the charged potential on the surface of the composition layer 401 uniform.

It is preferred that the discharge wire 205 is provided with a cleaning pad (not shown) as a cleaning member. As the cleaning pad, a soft member such as a sponge can be used, and it is possible to dispose the cleaning pad so as to sandwich the discharge wire 205 from both sides. As illustrated in FIG. 3B, it is effective to provide a mechanism which receives a drive from a screw 207 and allows the cleaning pad to move in the longitudinal direction of the corona charger via a carriage 208.

Figure 4:
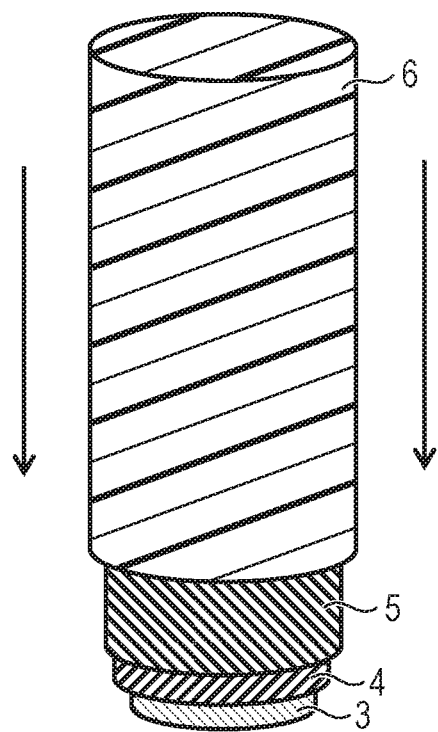
FIG. 4 is a schematic view of an example of a step of laminating a surface layer.

(6-4) Step of Forming Adhesive Layer on Elastic Layer
(6-5) Step of Forming Surface Layer on Elastic Layer FIG. 4 is a schematic view illustrating an example of a step of laminating the surface layer 6 on the elastic layer 4 including the silicone rubber via the adhesive layer 5 formed using the addition-curable silicone rubber adhesive. First, the addition-curable silicone rubber adhesive is applied to the surface of the elastic layer 4 formed on the outer circumference surface of the substrate 3. Further, a fluororesin tube for forming the surface layer 6 is applied to the outer surface thereof and laminated thereon. An inner surface of the fluororesin tube can be subjected to a sodium treatment, an excimer laser treatment, an ammonia treatment, or the like in advance to improve adhesion.

The method of coating the fluororesin tube is not particularly limited, but a method of coating the addition-curable silicone rubber adhesive as a lubricant, or a method of expanding the fluororesin tube from the outside and performing coating, can be used. The excess addition-curable silicone rubber adhesive remaining between the elastic layer 4 and the surface layer 6 made of the fluororesin can be removed by cleaning, using a unit (not shown). A thickness of the adhesive layer 5 after being cleaned is preferably 20 μm or less, from the viewpoint of a heat transfer property.

Next, the adhesive layer 5 and the surface layer 6 can be formed on the elastic layer 4 by heating for a predetermined time by a heating unit such as an electric furnace to cure and adhere the addition-curable silicone rubber adhesive. Conditions such as a heating time and a heating temperature can be appropriately set according to the used adhesive and the like. Both ends of the obtained member in the width direction can be cut into a desired length to obtain the fixing member.

<Confirmation of Localization State of Iron Oxide Particles in the Vicinity of Thermally Conductive Particles in Elastic Layer>

The localization state of the iron oxide particles can be confirmed by a parameter referred as "localization index M" derived from a Euclidean distance map of the thermally conductive particles and the iron oxide particles observed in a cross-sectional image of the elastic layer. Hereinafter, the method will be described.

First, a measurement sample is prepared. From the fixing member, for example, a measurement sample having a length of 5 mm, a width of 5 mm, and a thickness equal to a total thickness of the fixing member is collected at an arbitrary position of the fixing member. The obtained sample is polished using an ion milling device (trade name: IM4000, manufactured by Hitachi High-Tech Corporation) so that an arbitrary cross section is exposed. In the polishing of the cross section by ion milling, it is possible to prevent the particles from falling off from the sample and the abrasive from being mixed, and to form a cross section having a few polishing traces.

Figure 5A:
FIGS. 5A, 5B, 5C, 5D, and 5E are drawings illustrating an example of a process of deriving a localization index M for thermally conductive particles and iron oxide particles in an elastic layer.

Subsequently, an arbitrary cross section of the elastic layer in the thickness direction is observed with a scanning electron microscope (SEM) (trade name: FE-SEM SIGMA500 VP, manufactured by Zeiss) to obtain an image of the cross section (FIG. 5A). The observation conditions are, for example, an acceleration voltage of 8.0 kV and a working distance of 8 mm, as reflection electron image acquisition conditions in a backscattered electron image mode of 5000 times.

In the backscattered electron image, a difference in brightness is different depending on the respective constituent elements of the rubber, the thermally conductive particles, and the iron oxide particles. Such ternarization based on the difference in brightness can be realized by classifying the luminance of the image into 256 gradations.

Figure 5B:
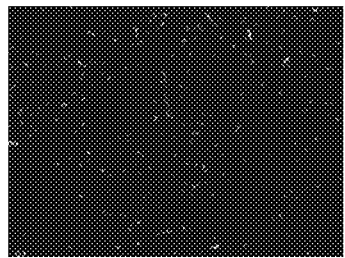
Figure 5C:
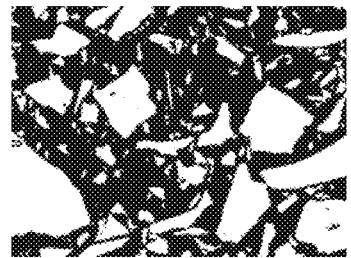

Such features of the backscattered electron image are utilized to obtain a first image (FIG. 5B) in which only iron oxide particles are extracted from the cross-sectional image of the fixing member and a second image (FIG. 5C) in which only thermally conductive particles are extracted. Specifically, for example, first, the backscattered electron image is read by an image analysis software, ImageProPlus, manufactured by MediaCybernetics to determine a luminance distribution of the image. Next, a luminance range of the determine luminance distribution is set to enable ternarization which allows discrimination of rubber, thermally conductive particles, and iron oxide particles, and to obtain the first image in which only the iron oxide particles are extracted, and the second image in which only the thermally conductive particles are extracted.

A method of discriminating rubber, thermally conductive particles, and iron oxide particles is not necessarily limited to the method using the difference in brightness of a backscattered electron image. For example, first, an element mapping image in the same field of view is obtained by scanning electron microscope energy dispersive X-ray spectrometry (SEM-EDS). Thereafter, the rubber, the thermally conductive particles, and the iron oxide particles can be accurately discriminated by identifying each particle in the image by comparison with the backscattered electron image.

A method of deriving the localization index M from the first image in which only the iron oxide particles are extracted and the second image in which only the thermally conductive particles are extracted in the same angle of view by the above-described procedures will be described.

Since localization indexing is performed by applying digital image processing technology to these images, it is assumed that the images are all in a general digital image format in which pixels are arranged in a grid. Further, the first image and the second image which are binarized images are grayscale images of only luminance information, and thereafter, images obtained by performing image processing on these images are all grayscale images in the same format, unless otherwise specified.

First, an image processing procedure for the first image will be described. Bright spots on the first image represent the iron oxide particles. One iron oxide particle is composed of a plurality of pixels, but in order to identify which area is a single particle, a particle labeling process was performed. Labeling is processing of assigning a number to each block in which high-luminance portions are connected in a binarized image.

There are generally two types of determination method of connection: four connections in which connection is effective only in the up, down, left, and right of pixels, and eight connections in which connection in diagonal directions are further effective. Here, an example in which connection is determined by four connections, labeling processing is performed on the first image, and a number (label) is assigned to every iron oxide particle will be described.

In order to index the positional relationship between the iron oxide particles and the thermally conductive particles, it is necessary to acquire the existing position of the iron oxide particles in space as coordinates. The coordinate values to be acquired are in a coordinate system in pixel units. In the coordinate system, an upper left corner of the image is defined as an origin (0, 0), an axis with the right in a plus direction is defined as an x-axis, and an axis with the lower part in the plus direction is defined as a y-axis. The image has a size of 1024×682 pixels, and has a coordinate system in which the upper left is (0, 0) and the lower right is (1023, 681).

Since the iron oxide particles are small but have a size, one iron oxide particle extends over a plurality of pixels. In the present embodiment, center-of-gravity coordinates of a plurality of pixels constituting a particle are applied, as coordinate values representing the position of the particle. Assuming that the coordinates of each pixel constituting the iron oxide particles are $(x_n, y_n)$, the center-of-gravity coordinates $(x_g, y_g)$ are determined by the following Equation 1.

$$(x_g, y_g) = \left( \frac{\sum x_n}{N}, \frac{\sum y_n}{N} \right) \qquad \text{Equation 1}$$

Based on this formula, the coordinates of each labeled iron oxide particle are derived, and the obtained coordinate values are rounded off to the nearest whole number to be converted to integers and output and stored as center-of-gravity coordinate data. The reason for converting the coordinate values into integers is to use the coordinate information described in the center-of-gravity coordinate data in a process of deriving a distance between the thermally conductive particles and the iron oxide particles, which will be described later.

Figure 5D:
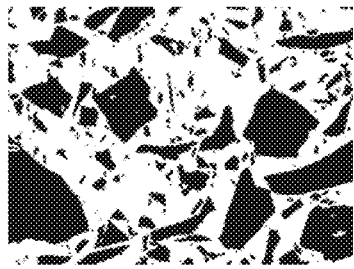

Next, a processing procedure for the second image will be described. First, processing of inverting the contrast is performed on a binarized image in which the thermally conductive particle portion has a maximum luminance and the other portions have a luminance value of 0, thereby obtaining a third image. This process does not need to be performed in the case in which a binary image in which the thermally conductive particle portion has a luminance value of 0 from the beginning is obtained when the ternarization processing described above is performed. In any case, the third image (FIG. 5D) has the luminance value of the thermally conductive particle portion of 0, and the other portions having the maximum luminance.

The third image is used to determine a Euclidean distance to the outermost surface of the closest thermally conductive particles to all pixels in the image, and the distance value is replaced with the luminance value of each pixel to obtain a Euclidean distance map image. The Euclidean distance is a distance value given by the following Equation 2 when coordinates of two pixels are $(x_1, y_1)$ and $(x_2, y_2)$, respectively:

$$\sqrt{(x_1-x_2)^2=(y_1 \times y_2)^2}$$ Equation 2

Figure 5E:
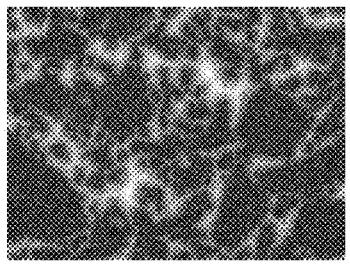

The coordinate system is a coordinate system in pixel units, like when the center-of-gravity coordinate data of the iron oxide particles is obtained, and the unit of the Euclidean distance is also a size of pixel units. The Euclidean distance map corresponding to the third image is as shown in FIG. 5E.

Several algorithms are known for obtaining Euclidean distance map image.

The simplest algorithm is a method of determining the Euclidean distance value from the pixel of interest to all the pixels corresponding to the thermally conductive particles of which the luminance value is 0, and searching for the smallest value among those values. When the algorithm is used, the value of the distance between pixels is calculated as many times as the number of an order of the square of the number of pixels, and thus, the processing has large calculation amount and is time-consuming. For this reason, many algorithms to obtain the same result with a small amount of calculation, have been developed. Here, an example of applying a method called sequential distance conversion, will be described.

In the sequential distance conversion, two processings are performed. In a first processing, when an origin of a coordinate system of an image is upper left of the image, the right direction is an x-axis, and the downward direction is a y-axis, move from the origin as a starting point to the right by one pixel at a time. When reaching one row, move down one row in the y direction, and move from left to right by one pixel at a time. In this process, the following processing is sequentially performed. That is, the pixel value at the current position is $I(x, y)$, the pixel value of one pixel left from the current position is $I(x-1, y)$, and the pixel value of one pixel up from the current position is $I(x, y-1)$. At this time, processing of rewriting the minimum value among $I(x, y)$, $I(x-1, y)+1$, and $I(x, y-1)+1$ as the pixel value at the current position is sequentially performed.

At the end of the image, there may be a case where there is no pixel located on the left or above, and in this case, the processing is performed only on the existing pixels among the three pixels.

After performing this series of processing for all pixels on the image, the following second processing is performed. In the coordinate system, the upper left of the image is the origin as in the first processing, but the bottom right of the image, that is, the last point when the first processing is performed is the start point. Contrary to the first processing, move to the left by one pixel at a time, and when reaching one row, the following processing is sequentially performed while moving up one row in the y direction and moving from the right to the left by one pixel at a time. That is, the pixel value at the current position is $I(x, y)$, the pixel value of one pixel right from the current position is $I(x+1, y)$, and the pixel value of one pixel down from the current position is $I(x, y+1)$. At this time, processing of rewriting the minimum value among $I(x, y)$, $I(x+1, y)+1$, and $I(x, y+1)+1$ as the pixel value at the current position is sequentially performed.

It can be said that in the second processing, the same processing is performed while moving in the opposite direction to the first process. When such a processing algorithm is used, it is possible to obtain the same result as the Euclidean distance map required by a method of determining all distance between pixels described above with a calculation amount of around the order of the number of pixels×several times. There is a plurality of types of algorithms for deriving the Euclidean distance map other than the algorithm described above. Since both methods aim at increasing the efficiency of the calculation, and the obtained value of the distance map does not change, other methods of deriving a Euclidean distance map may be used.

Next, a step of using the center-of-gravity coordinate data and the Euclidean distance map of the iron oxide particles described above to obtain a cumulative relative frequency distribution Ga for the distance between the thermally conductive particles and the iron oxide particles will be described.

First, the coordinates of each iron oxide particle recorded in the center-of-gravity coordinate data are referred to, and the value of the Euclidean distance map at the position of the coordinates is referred to and acquired. Since the value of the center-of-gravity coordinates is obtained in pixel units, the same coordinate system is used for the Euclidean distance map. Here, an example of using a coordinate system in which the upper left is (0, 0) and the lower right is (1023, 681) will be described.

The value at each center-of-gravity coordinate corresponds to a distance from a position to the outermost surface of the thermally conductive particle closest to the position, and the unit is a pixel unit. Therefore, in order to convert the value into the actual distance in the material, it is necessary to multiply the size per one pixel according to the observation magnification and the image size of the SEM image. In the SEM images illustrated in FIGS. 5A to 5E, the length of one pixel corresponds to 0.058 μm, and thus, a value obtained by multiplying each reference value by 0.058 μm is an actual distance value.

Figure 6:
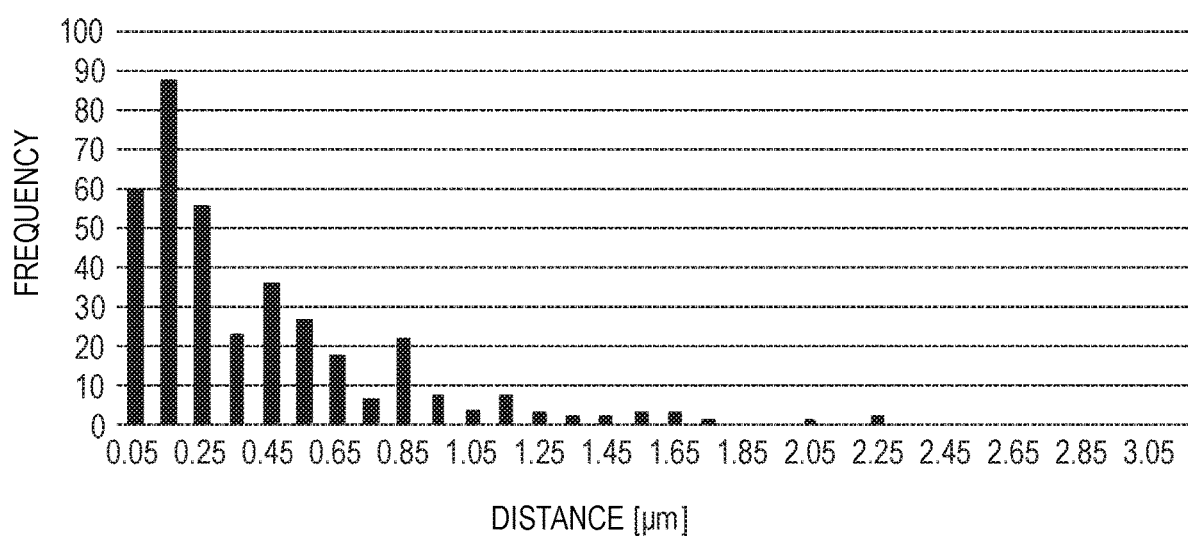
FIG. 6 is a histogram of distance values from each iron oxide particle to an outermost surface of closest thermally conductive particle.

A histogram is created for the distance value to the outermost surface of the thermally conductive particles for every iron oxide particle obtained by the above processing. In the histogram to be created, the horizontal axis represents distance, a vertical axis represents frequency, and each section of the horizontal axis is in increments of 0.1 μm, such as 0 or more and less than 0.1 μm, 0.1 μm or more and less than 0.2 μm, and so on. FIG. 6 illustrates the thus-obtained histogram.

Figure 7:
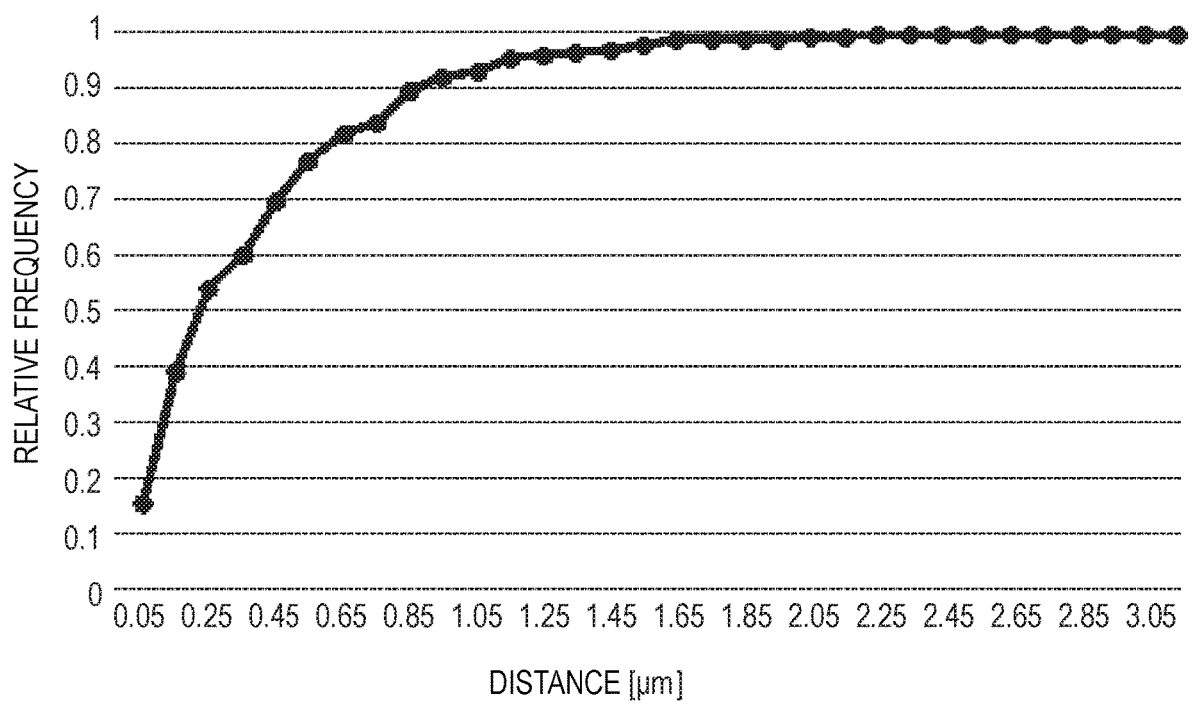
FIG. 7 is a drawing illustrating a cumulative relative frequency distribution Ga of a distance between iron oxide particles and thermally conductive particles.

From this histogram, the values of each section are sequentially added, and the value of each section becomes the sum of the frequencies below that section, thereby obtaining a cumulative frequency distribution. In this cumulative frequency distribution, a total score when the section value is the maximum is represented, and a value obtained by normalizing all of the frequencies with the total score value being 100% is referred to as a cumulative relative frequency distribution Ga. The cumulative relative frequency distribution Ga is as shown in FIG. 7.

The histogram and the cumulative relative frequency distribution Ga described above are different depending on whether the iron oxide particles are localized in the vicinity of the thermally conductive particles or not. Specifically, as the ratio of the frequency when the distance from the iron oxide particles to the outermost surface of the thermally conductive particles is short is higher, the state in which the iron oxide particles are localized in the vicinity of the thermally conductive particles is represented.

In order to quantitatively evaluate how much the frequency ratio when the distance from the iron oxide particles to the outermost surface of the thermally conductive particles is short is increased, a difference is evaluated based on the state in which the iron oxide particles are completely randomly distributed. The concept based on a random distribution is frequently used in the field of spatial statistics, and first, an expected value as to what cumulative frequency distribution will be obtained when a random distribution as a standard is obtained, is obtained by the following procedure.

In the present embodiment, since the iron oxide particles exist only in positions other than positions where the thermally conductive particles exist in the second image, it is necessary to obtain the expected value of the cumulative frequency distribution for the distance between the iron oxide particles and the thermally conductive particles when points are randomly placed in the portions other than the thermally conductive particles. Therefore, the coordinates are randomly picked up from the second image, and the values on the Euclidean distance map created from the third image in the coordinates at that time are referred to.

Figure 8:
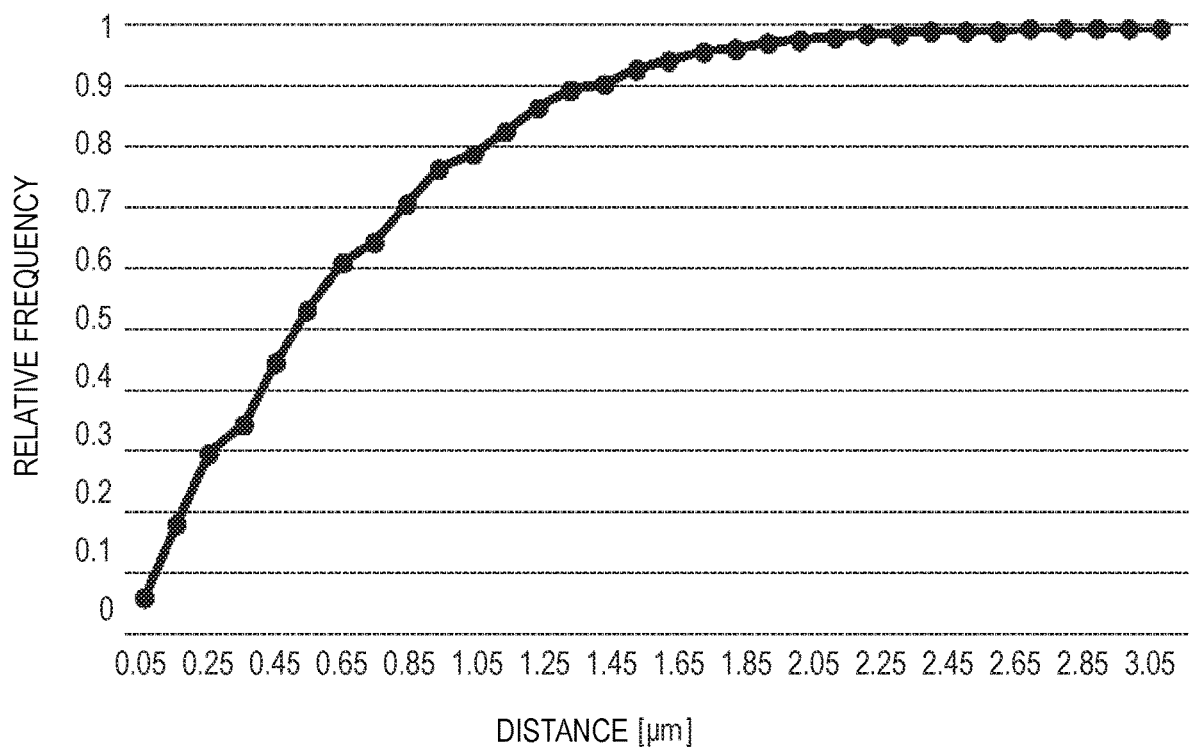
FIG. 8 is a drawing illustrating a cumulative relative frequency distribution Gr when iron oxide particles have a random distribution.

At this time, what numerical value on the Euclidean distance map referred to depends on the distribution of distance values. For example, if there is a Euclidean distance map composed of distance 1 of 500 pixels, distance 2 of 300 pixels, and distance 3 of 200 pixels, distance 1 is selected with a probability of 50%, distance 2 is selected with a probability of 30%, and distance 3 is selected with a probability of 20%. When random sampling is continued in such an environment, asymptotic approach is made so that 50% of the sampled points is distributed in distance 1, 30% of the sampled points is distributed in distance 2, and 20% of the sampled points is distributed in distance 3. That is, the expected value of the histogram at the time of the random distribution is the same as the histogram of the distance values of the entire Euclidean distance map created from the third image. Therefore, when a cumulative relative frequency distribution Gr is obtained from the distance values on the Euclidean distance map created from the third image, the expected value of the cumulative relative frequency distribution at the time of random distribution can be obtained. The section of the cumulative relative frequency distribution Gr is set at intervals of 0.1 μm in the same manner as when Ga is determined. The cumulative relative frequency distribution Gr obtained as such is as shown in FIG. 8.

Figure 9:
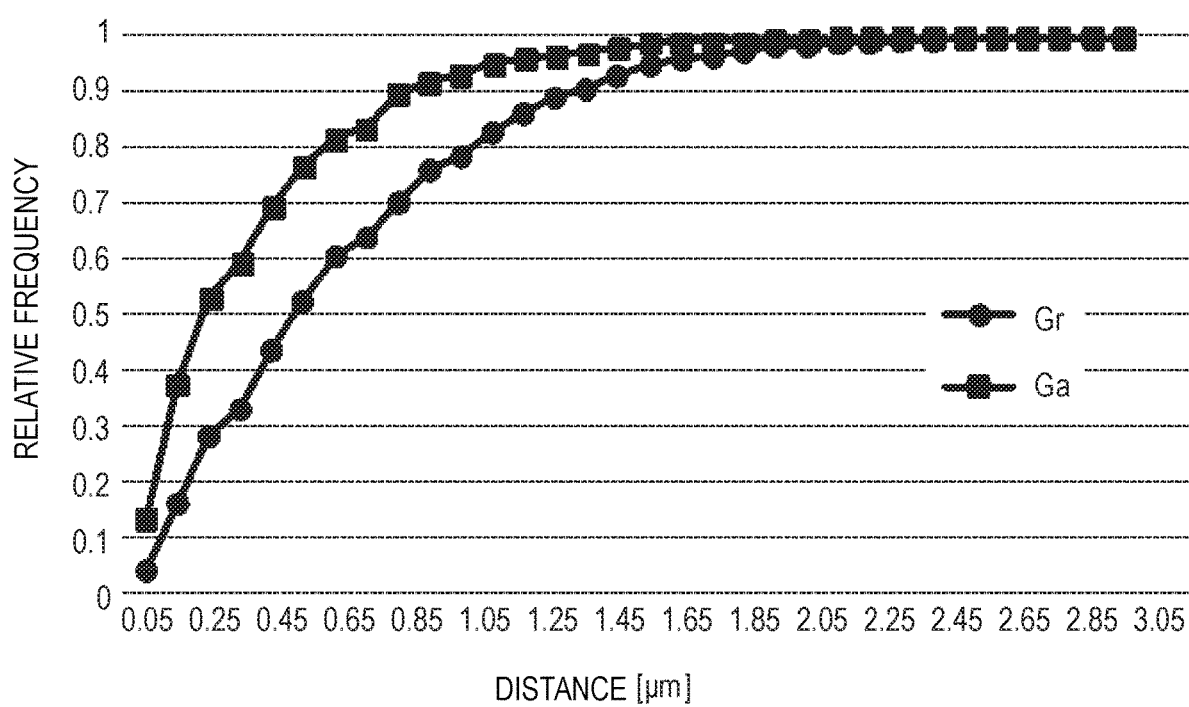
FIG. 9 is a drawing in which the cumulative relative frequency distributions Ga and Gr are compared.

FIG. 9 illustrates the result of comparing the values of the same section with respect to the aforementioned cumulative relative frequency distributions Ga and Gr. It can be seen that Ga has a larger value than Gr, especially at short distances. This suggests that the iron oxide particles are present at a shorter distance in Ga than in Gr which is the expected value of a random distribution. It shows that as the difference between the values of Ga and Gr is greater at shorter distances, the iron oxide particles are more strongly localized in the vicinity of the thermally conductive particles.

In the present disclosure, from the fact that a significant effect can be obtained by localization of the iron oxide particles particularly within a distance from the thermally conductive particles of 0.5 μm, the difference between Ga and Gr of 0.5 μm or less is obtained, and the average value thereof is defined as the localization index M.

The localization index M is represented by the following Equation 3. Here, d indicates a distance between the outermost surface of the thermally conductive particles and the iron oxide particles.

$$M = \left\{ \sum_{0}^{0.5} (Ga(d) - Gr(d)) \right\} \Big/ 5 \qquad \text{Equation 3}$$

The localization index M is derived by the above method.

When the value of the localization index M is 0.2 or more and less than 0.8, the iron oxide particles are sufficiently localized in the vicinity of the thermally conductive particles. As a result, a fixing member having further improved heat resistance and durability can be obtained.

When the localization index M is determined from each of the cross sections in the thickness direction at any five positions of the elastic layer, the respective values are defined as M1 to M5. At this time, when the localization index M at at least three positions among the five positions, is 0.2 or more and less than 0.8, the heat resistance and durability can be further improved.

(7) Heat Fixing Device

A heat fixing device according to another embodiment of the present disclosure has a heating member and a pressure member disposed to face the heating member. That is, the heat fixing device is configured such that a pair of heated rotating bodies such as a roller and a roller, a belt and a roller, and a belt and a belt are brought into press contact with each other. The type of the heat fixing device is appropriately selected in consideration of conditions such as a process speed and a size of the entire electrophotographic image forming apparatus on which the heat fixing device is mounted.

In the heat fixing device, the heated fixing member and the heated pressure member are brought into press contact to form a nip portion N, and a recording medium S which is an object to be heated, having an image formed thereon by an unfixed toner, is pinched and conveyed to the nip portion N. The image formed by the unfixed toner is called a toner image t. The recording medium S is pinched and conveyed to the nip portion N to heat and press the toner image t. As a result, the toner image t is melted and color-mixed, and then cooled to fix the image on the recording medium.

Hereinafter, the configuration of the heat fixing device will be described with reference to specific examples, but the scope and use of the present disclosure are not limited thereto.

(7-1) Heating Belt-Pressure Belt Type Heat Fixing Device

Figure 10:
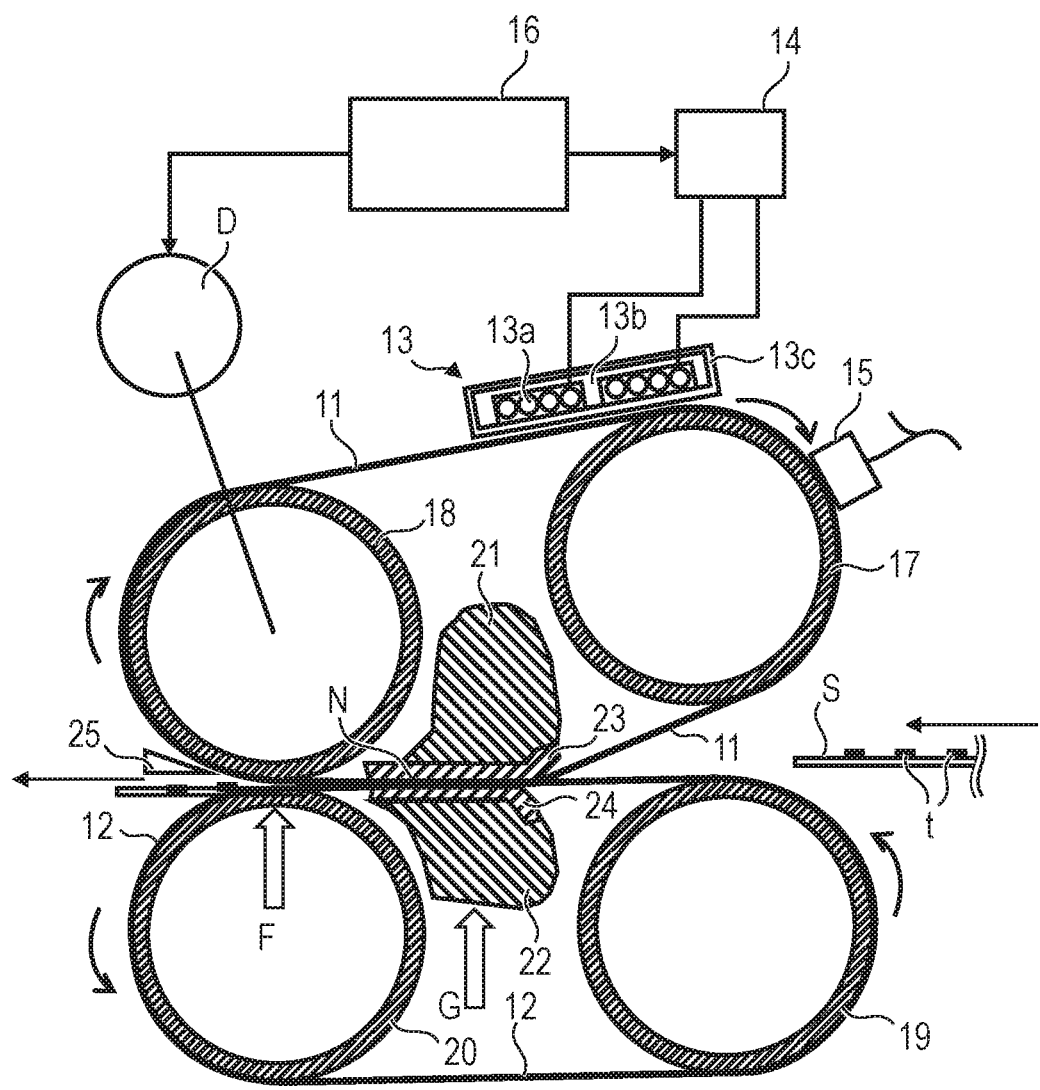
FIG. 10 is a schematic cross-sectional view illustrating an example of a heat fixing device of a heating belt-pressure belt type.

FIG. 10 is a schematic cross-sectional view of an example of heat fixing device having a heating belt as a heating member, which is a so-called twin-belt type heat fixing device in which a pair of rotating bodies such as a heating belt 11 and a pressure belt 12 are brought into press contact with each other. As the heating belt, a fixing member according to an embodiment of the present disclosure can be used.

Here, a width direction of the heat fixing device or a member constituting the heat fixing device is a direction perpendicular to a paper surface of FIG. 10. In the heat fixing device, a front surface is a surface in an introduction side of the recording medium S. Left and right mean left and right when the device is viewed from the front surface. A width of the belt is a belt dimension in a left-right direction when the device is viewed from the front surface. A width of the recording medium S is a dimension of the recording medium in a direction orthogonal to a conveyance direction. Further, the term "upstream" or "downstream" means upstream or downstream with respect to the conveyance direction of the recording medium.

The heat fixing device includes the heating belt 11 as a fixing member and the pressure belt 12. The heating belt 11 and the pressure belt 12 are obtained by stretching a heating belt including a flexible substrate made of metals having nickel as a main component over two rollers, as illustrated in FIG. 2A.

As a heating unit of the heating belt 11, a heating source (induction heating member, excitation coil) capable of heating by electromagnetic induction heating with high energy efficiency is employed. An induction heating member 13 includes an induction coil 13a, an excitation core 13b, and a coil holder 13c holding them. The induction coil 13a is disposed in the horizontal E-shaped excitation core 13b protruding on the center and both sides of the induction coil, using an elliptically flat-wound litz wire. Since the excitation core 13b is made of a material having a high magnetic permeability and a low residual magnetic flux density such as ferrite or permalloy, the loss in the induction coil 13a and the excitation core 13b can be suppressed, and the heating belt 11 can be efficiently heated.

When a high-frequency current flows from an excitation circuit 14 to the induction coil 13a of the induction heating member 13, a substrate of the heating belt 11 is induction heated and the heating belt 11 is heated from a substrate side. A surface temperature of the heating belt 11 is detected by a temperature detection element 15 such as a thermistor. A signal relating to the temperature of the heating belt 11 detected by the temperature detection element 15 is sent to a control circuit unit 16. The control circuit unit 16 controls the power supplied from the excitation circuit 14 to the induction coil 13a so that the temperature information received from the temperature detection element 15 is maintained at a predetermined fixing temperature, and adjusts the temperature of the heating belt 11 to a predetermined fixing temperature.

The heating belt 11 is stretched by a roller 17 as a belt rotating member and a heating side roller 18. The roller 17 and the heating side roller 18 are borne and supported in a freely rotatable manner between left and right side plates (not shown) of the device, respectively.

The roller 17 is, for example, a hollow roller made of iron having an outer diameter of 20 mm, an inner diameter of 18 mm, and a thickness of 1 mm, and functions as a tension roller for applying tension to the heating belt 11. The heating side roller 18 is, for example, a highly slidable elastic roller in which a silicone rubber layer as an elastic layer is provided on an iron alloy mandrel having an outer diameter of 20 mm and a diameter of 18 mm.

The heating side roller 18 is a driving roller, and is driven to rotate at a predetermined speed in a clockwise direction indicated by an arrow, by inputting a driving force from a driving source (motor) D via a driving gear train (not shown). The heating side roller 18 is provided with the elastic layer as described above, whereby the driving force input to the heating side roller 18 can be transferred well to the heating belt 11, and simultaneously, a nip portion for securing separability of the recording medium from the heating belt 11 can be formed. Since the heating side roller 18 has the elastic layer, heat conduction to the heating side roller is also decreased, which is thus effective in shortening a warm-up time.

When the heating side roller 18 is driven to rotate, the heating belt 11 rotates together with the roller 17 by friction between a silicone rubber surface of the heating side roller 18 and an inner surface of the heating belt 11. The arrangement and size of the roller 17 and the heating side roller 18 are selected according to the size of the heating belt 11. For example, dimensions of the roller 17 and the heating side roller 18 are selected so that the heating belt 11 having an inner diameter of 55 mm when not mounted can be stretched.

The pressure belt 12 is stretched by a tension roller 19 and a pressure side roller 20, as a belt rotating member. An inner diameter of the pressure belt when not mounted is, for example, 55 mm. The tension roller 19 and the pressure side roller 20 are borne and supported in a freely rotatable manner between left and right side plates (not shown) of the device, respectively.

The tension roller 19 is provided, with for example, a silicon sponge layer on an iron alloy mandrel having an outer diameter of 20 mm and an inner diameter of 16 mm for decreasing heat conductivity to decrease heat conduction from the pressure belt 12. The pressure side roller 20 is, for example, a rigid roller having low slidability made of an iron alloy having an outer diameter of 20 mm, an inner diameter of 16 mm, and a thickness of 2 mm. Similarly, the dimensions of the tension roller 19 and the pressure side roller 20 are selected according to the dimension of the pressure belt 12.

Here, in order to form a nip portion N between the heating belt 11 and the pressure belt 12, left and right ends of a rotating shaft of the pressure side roller 20 is pressed toward the heating side roller 18 by a pressurization mechanism (not shown) at a predetermined pressurizing force in a direction indicated by an arrow F.

Further, in order to obtain a wide nip portion N without increasing the size of the device, a pressure pad is employed. That is, a fixing pad 21 serving as a first pressure pad for pressing the heating belt 11 toward the pressure belt 12, and a pressure pad 22 serving as a second pressure pad for pressing the pressure belt 12 toward the heating belt 11, are provided. The fixing pad 21 and the pressure pad 22 are supported and disposed between left and right side plates (not shown) of the device. The pressure pad 22 is pressed toward the fixing pad 21 by a pressurization mechanism (not shown) at a predetermined pressurizing force in the direction of arrow G. The fixing pad 21, which is a first pressure pad, has a sliding sheet (low friction sheet) 23 in contact with a pad substrate and the belt. The pressure pad 22, which is the second pressure pad, also has a sliding sheet 24 in contact with the pad substrate and the belt. This is because there is a problem that scraping of the portion of the pad which rubs against an inner circumference surface of the belt is increased. By interposing the sliding sheets 23 and 24 between the belt and the pad substrate, the pad can be prevented from being scraped and the sliding resistance can be reduced, and thus, good belt running performance and belt durability can be ensured.

The heating belt is provided with a non-contact type anti-static brush (not shown), and the pressure belt is provided with a contact type anti-static brush (not shown).

The control circuit unit 16 drives the motor D at least during execution of image formation. As a result, the heating side roller 18 is driven to rotate, and the heating belt 11 is driven to rotate in the same direction. The pressure belt 12 rotates following the heating belt 11. Here, belt slippage can be prevented by adopting a configuration in which the down-most stream portion of the nip is conveyed in the state of being interposed between the heating belt 11 and the pressure belt 12 by the roller pairs 18 and 20. The downmost stream portion of the nip is a portion where the pressure distribution (a recording medium conveyance direction) at the nip portion is maximum.

In a state where the heating belt 11 raises the temperature to a predetermined fixing temperature and maintains the temperature (referred to as temperature control), the recording medium S having the unfixed toner image t is conveyed to the nip portion N between the heating belt 11 and the pressure belt 12. The recording medium S is introduced with the surface carrying the unfixed toner image t facing the heating belt 11 side. Then, the unfixed toner image t of the recording medium S is pinched and conveyed while being in close contact with the outer circumference surface of the heating belt 11, so that heat is applied from the heating belt 11, and receives the pressurizing force to be fixed on the surface of the recording medium S. At this time, heat from the heated substrate of the heating belt 11 is efficiently transported to the recording medium S through the elastic layer having increased thermal conductivity in the thickness direction. Thereafter, the recording medium S is separated from the heating belt by a separating member 25 and conveyed.

(7-2) Heating Belt-Pressure Roller Type Heat Fixing Device

Figure 11:
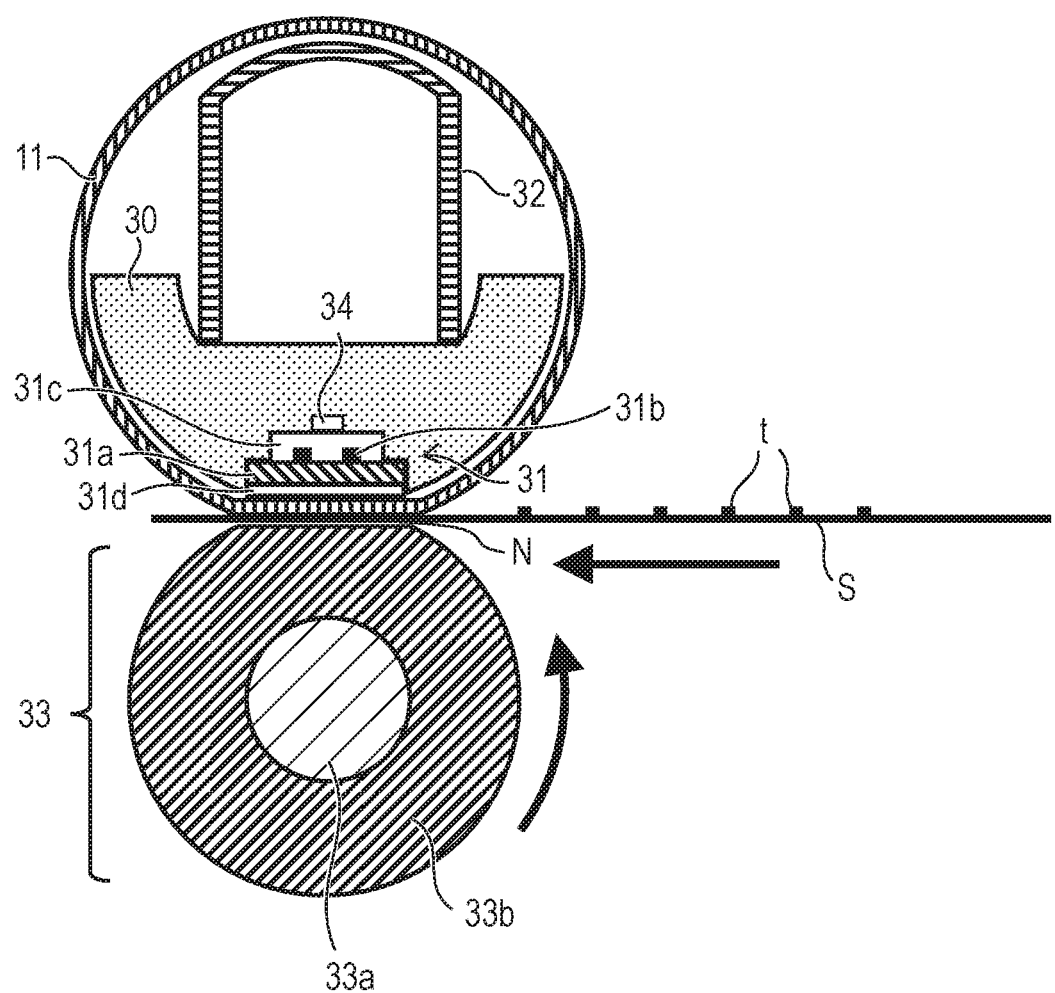
FIG. 11 is a schematic cross-sectional view illustrating an example of a heat fixing device of a heating belt-pressure roller type.

FIG. 11 is a schematic view illustrating an example of the heating belt-pressure roller type heat fixing device provided with a fixing belt 11 having an endless belt shape, a pressure roller 33, and a ceramic heater 31 which is disposed in the fixing belt 11 as a heating body for heating the fixing belt by non-radiant heat, according to an embodiment of the present disclosure. In the heat fixing device according to the present disclosure, the heater for heating the fixing belt is not limited to the heater for heating the fixing belt by non-radiant heat shown in the present embodiment. For example, a heater such as a halogen heater which can heat the fixing belt by radiant heat can be used.

There is a belt guide 30 having heat resistance and heat insulation properties for holding the heating belt 11, and the ceramic heater 31 for heating the heating belt 11 at a position where the belt guide 30 is in contact with the heating belt 11 (substantially at the center of a lower surface of the belt guide 30). The ceramic heater 31 is fixedly supported by being fitted into a groove formed and provided along a length of the guide. The heating belt 11 is loosely fitted to the belt guide 30. A rigid stay for pressurization 32 is inserted into the belt guide 30.

On the other hand, the pressure roller 33 is provided so as to face the heating belt 11. The pressure roller 33 is an elastic pressure roller, that is, a mandrel 33a which is provided with an elastic layer of silicone rubber 33b and has a decreased hardness, and both ends of the mandrel 33a are arranged to be borne and held in a freely rotatable manner between front and rear chassis side plates (not shown) of the device. The elastic pressure roller is covered with a tetrafluoroethylene/perfluoroalkyl ether copolymer (PFA) tube, for improving the surface properties.

Pressure springs (not shown) are compressively provided, respectively, between both ends of the rigid stay for pressurization 32 and a spring-receiving member (not shown) on an apparatus chassis side, so that a pressing force is applied to the rigid stay for pressurization 32. Then, in the nip portion N, the heating belt 11 is interposed between a lower surface of the ceramic heater 31 and an upper surface of the pressure roller 33, disposed on the lower surface of the belt guide 30 made of heat-resistant resin.

The pressure roller 33 is driven to rotate in a counterclockwise direction as shown by an arrow by a driving unit (not shown). A rotational force acts on the heating belt 11 by the frictional force between the pressure roller 33 and an outer surface of the heating belt 11 due to the rotational drive of the pressure roller 33 and the heating belt 11 rotates around the exterior of the belt guide 30 (pressure roller drive system). The heating belt 11 rotates at a circumferential speed substantially corresponding to a rotational circumferential speed of the pressure roller 33 as shown by an arrow in a clockwise direction, while the inner surface of the heating belt 11 slides in the state of being in close contact with the lower surface of the ceramic heater 31 at the nip portion N.

The rotation of the pressure roller 33 is started based on a print start signal, and the heating up of the ceramic heater 31 is started. The rotational circumferential speed of the heating belt 11 is stabilized by the rotation of the pressure roller 33, and a temperature of a temperature detection element 34 provided on an upper surface of the ceramic heater rises to a predetermined temperature, for example, 180° C. At this moment, a recording medium S carrying an unfixed toner image t as a material to be heated is introduced between the heating belt 11 of the nip portion N and the pressure roller 33, with a toner image-carrying surface side being toward a heating belt 11 side.

Then, the recording medium S is brought into close contact with the lower surface of the ceramic heater 31 via the heating belt 11 at the nip portion N, and moves and passes through the nip portion N together with the heating belt 11. In the movement passage process, the heat of the heating belt 11 is applied to the recording medium S, and the unfixed toner image t is heated and fixed on the surface of the recording medium S. The recording medium S which has passed through the nip portion N is conveyed separately from the outer surface of the heating belt 11.

The ceramic heater 31 as a heating body is a horizontally long linear heating body having a low heat capacity with a direction perpendicular to the moving direction of the heating belt 11 and the recording medium S being a longitudinal direction. It is preferred that the ceramic heater 31 includes a heater substrate 31a, a heat generating layer 31b provided on a surface of the heater substrate 31a along a length thereof, a protective layer 31c further provided thereon, and a sliding member 31d, as a basic configuration. Here, the heater substrate 31a can be made of aluminum nitride or the like.

The heat generating layer 31b can be formed by applying an electric resistance material such as Ag/Pd (silver/palladium) at a thickness of about 10 μm and a width of 1 to 5 mm by screen printing or the like. The protective layer 31c can be made of glass, fluororesin, or the like. The ceramic heater used in the heat fixing device is not limited thereto.

Then, by applying electricity between both ends of the heat generating layer 31b of the ceramic heater 31, the heat generating layer 31b generates heat, and a temperature of the ceramic heater 31 rapidly rises. The ceramic heater 31 is fixedly supported by fitting a protective layer 31c side upward into a groove formed and provided substantially in the center of the lower surface of the belt guide 30 along a length of the guide. In the nip portion N in contact with the heating belt 11, a surface of the sliding member 31d of the ceramic heater 31 and the inner surface of the heating belt 11 are in contact and slide with each other.

As described above, the heating belt 11 increases the heat conductivity in the thickness direction of the elastic layer including the silicone rubber and also keeps the hardness low. With such a configuration, the heating belt 11 allows the unfixed toner image to be efficiently heated, and due to its low hardness, allows a high-quality image to be fixed on the recording medium S in the nip portion N.

According to an embodiment of the present disclosure, a fixing member having further improved heat resistance can be obtained. Further, according to another embodiment of the present disclosure, a heat fixing device having excellent durability can be obtained.

EXAMPLES

Hereinafter, the present disclosure will be described in more detail with reference to the Examples.

Example 1

(1) Preparation of Liquid Addition-Curable Silicone Rubber Composition

First, 98.6 parts by mass of a silicone polymer (trade name: DMS-V35, manufactured by Gelest, Inc., viscosity: 5000 mm$^2$/s) was prepared as component (a). The silicone polymer has a vinyl group which is an unsaturated aliphatic group only at both ends of a molecular chain, and has a methyl group as an unsubstituted hydrocarbon group containing no other unsaturated aliphatic group. The silicone polymer is a polymer in which all $R^3$ is a methyl group and all $R^4$ is a vinyl group in Structural Formula (2).

Next, the silicone polymer was blended with metal silicon (trade name: M-Si #600, manufactured by KINSEI MATEC CO., LTD., average particle size: 7 µm) having an oxidization-treated surface as thermally conductive particles, at 35% by volume with respect to the silicone component. Further, iron oxide particles (trade name: Toda Color 130ED, manufactured by TODA KOGYO CORP., average particle size: 0.20 µm) were blended, at 0.3% by volume with respect to the silicone component, and sufficiently mixed, to obtain Mixture 1.

Next, 0.2 part by mass of 1-ethynyl-1-cyclohexanol (manufactured by Tokyo Chemical Industry Co., Ltd.) as a curing retarder dissolved in the same weight of toluene was added to Mixture 1 to obtain Mixture 2.

Next, 0.1 part by mass of a hydrosilylation catalyst (platinum catalyst: a mixture of 1,3-divinyltetramethyldisiloxane platinum complex, 1,3-divinyltetramethyldisiloxane, and 2-propanol) as component (c) was added to Mixture 2 to obtain Mixture 3.

Further, as component (b), 1.4 parts by mass of a silicone polymer in which a siloxane skeleton has an active hydrogen group bonded to silicon only in a side chain (trade name: HMS-301, manufactured by Gelest, Inc., viscosity: 30 mm$^2$/s) was weighed. This was added to Mixture 3 and sufficiently mixed to obtain a liquid addition-curable silicone rubber composition.

(2) Manufacture of Heating Belt

A nickel electroformed endless belt having an inner diameter of 55 mm, a width of 420 mm, and a thickness of 65 µm was prepared as a substrate. During the series of manufacturing steps, the endless belt was handled by inserting a core therein. First, on an outer circumference surface of the substrate, a primer (trade name: DY39-051A/B, manufactured by Dow Corning Toray) was substantially uniformly applied so that a dry weight was 50 mg, and after drying a solvent, baking treatment was performed for 30 minutes in an electric furnace set at 160° C.

A 450 µm thick silicone rubber composition layer was formed on the primer-treated substrate by a ring coating method. Next, a corona charger was disposed to face a generatrix of the substrate having the silicone rubber composition layer on the outer circumference surface, and an outer surface of the silicone rubber composition layer was charged while rotating the substrate at 100 rpm. Charging conditions were as follows: a supply current to a discharge wire of the corona charger of −150 µA, a grid electrode potential of −950 V, a charging time of 20 seconds, and a distance between a grid electrode and the outer surface of the silicone rubber composition layer of 4 mm.

Next, the substrate was placed in an electric furnace and heated at a temperature of 160° C. for 1 minute to primarily cure the silicone rubber composition layer, and then heated at a temperature of 200° C. for 30 minutes to secondarily cure the silicone rubber composition layer, thereby forming an elastic layer.

Next, an addition-curable silicone rubber adhesive (trade name: SE1819CV A/B, manufactured by Dow Corning Toray Co., Ltd.) for forming an adhesive layer was almost uniformly applied on the surface of the elastic layer at a thickness of about 20 µm. A fluororesin tube (trade name: NSE, manufactured by GUNZE LIMITED.) having an inner diameter of 52 mm and a thickness of 40 µm for forming a surface layer was laminated thereon while expanding the diameter. Thereafter, by uniformly handling the belt surface from the top of the fluororesin tube, the excess adhesive was cleaned from the space between the elastic layer and the fluororesin tube so as to be as thin as about 5 µm. Next, the substrate was placed in an electric furnace and heated at a temperature of 200° C. for 1 hour to cure the adhesive, and the fluororesin tube was fixed on the elastic layer to obtain a heating belt.

(3) Evaluation of Dispersion State of Thermally Conductive Particles and Iron Oxide Particles by Localization Index M Five measurement samples were cut out from any five positions of the manufactured heating belt, and the localization indexes M1 to M5 were derived for each sample by the method described above.

(4) Evaluation of Heating Belt

The manufactured heating belt was incorporated in a heat fixing device of an electrophotographic copying machine (trade name: imagePRESS® C850, manufactured by Canon Inc.). Then, the heat fixing device was mounted on the copying machine. The copying machine was used to continuously pass A4 sheets (trade name: GFC-081, manufactured by Canon Inc.) at a printing speed of 85 sheets/min.

As an image, a black halftone image was formed on one surface and the paper was passed. In the durability evaluation, deformation of the belt appearance due to the destruction of the elastic layer was observed particularly in a non-paper passing portion to which a high temperature was applied, and the number of passed sheets at that time was evaluated.

Example 2

In the preparation of the silicone rubber composition in Example 1, the thermally conductive particles were changed to magnesium oxide (trade name: SL-WR, manufactured by Konoshima Chemical Co., Ltd., average particle size: 10 µm), and the blending amount was 43% by volume. Otherwise in the same manner as in Example 1, a silicone rubber composition was prepared, and a heating belt was manufactured. Further, the obtained heating belt was evaluated in the same manner as the evaluation of the heating belt according to Example 1.

Example 3

In the preparation of the silicone rubber composition in Example 1, the thermally conductive particles were changed to aluminum oxide (trade name: Alunabeads CB-P10, manufactured by SHOWA DENKO K.K., volume average particle size: 8 μm), and the blending amount was 50% by volume. Otherwise in the same manner as in Example 1, a silicone rubber composition was prepared, and a heating belt was manufactured. Further, the obtained heating belt was evaluated in the same manner as the evaluation of the heating belt according to Example 1.

Example 4

In the preparation of the silicone rubber composition in Example 1, the thermally conductive particles were changed to zinc oxide (trade name: LPZINC-11, manufactured by SAKAI CHEMICAL INDUSTRY CO., LTD., volume average particle size: 11 μm), and the blending amount was 45% by volume. Otherwise in the same manner as in Example 1, a silicone rubber composition was prepared, and a heating belt was manufactured. Further, the obtained heating belt was evaluated in the same manner as the evaluation of the heating belt according to Example 1.

Example 5

In the preparation of the silicone rubber composition in Example 1, the thermally conductive particles were changed to silicon carbide (trade name: insulation silicon carbide NG H-BD #1000, manufactured by Pacific Rundum Co., Ltd., volume average particle size: 13 μm), and the blending amount was 30% by volume. Otherwise in the same manner as in Example 1, a silicone rubber composition was prepared, and a heating belt was manufactured. Further, the obtained heating belt was evaluated in the same manner as the evaluation of the heating belt according to Example 1.

Example 6

(1) Preparation of Liquid Addition-Curable Silicone Rubber Composition

First, the metal silicon particles and the iron oxide particles used in Example 1 were mixed in advance. The following materials were added to a powder mixer (trade name: Super Mixer Piccolo, manufactured by KAWATA MFG. CO., LTD.), mixed at 3000 rpm for 1 hour, and then mixed at 300 rpm for 24 hours to obtain powder mixture 1.

- 300 g of metal silicon having an oxidation-treated surface (trade name: M-Si #600, manufactured by KINSEI MATEC CO., LTD., average particle size: 7 μm),
- 5.7 g of iron oxide particles (trade name: Toda Color 130ED, manufactured by TODA KOGYO CORP., volume average particle size 0.2 μm), and
- 3.0 g of hexamethyldisilazane (Wako Pure Chemical Industries, Ltd.).

In the preparation of the silicone rubber composition in Example 1, powder mixture 1 obtained above was used instead of Mixture 1, and the blending amount was 35.3% by volume. Otherwise in the same manner as in Example 1, a silicone rubber composition was prepared. In the preparation of the heating belt in Example 1, charging treatment using a corona charger was not performed. Except for that, a heating belt was manufactured in the same manner as in Example 1, and the obtained heating belt was evaluated in the same manner as the evaluation of the heating belt according to Example 1.

Comparative Examples 1 to 5

A heating belt was produced in the same manner as in Examples 1 to 5, except that the electric field application step using a corona charger was omitted.

TABLE 1

| | Thermally conductive particles | | Iron oxide particles | | Localization index M | | | | | | Number of positions of 0.2 or more and less than 0.8 | Heating belt durability (1,000 sheets) |
|---|---|---|---|---|---|---|---|---|---|---|---|
| | Kind | Blending ratio (% by volume) | Blending ratio (% by volume) | Localization method | M1 | M2 | M3 | M4 | M5 | | |
| Example 1 | Metal silicon | 35 | 0.3 | Electric field | 0.19 | 0.21 | 0.23 | 0.22 | 0.22 | 4 | 620 |
| Example 2 | Magnesium oxide | 43 | 0.3 | Electric field | 0.38 | 0.16 | 0.27 | 0.30 | 0.21 | 4 | 740 |
| Example 3 | Aluminum oxide | 50 | 0.3 | Electric field | 0.29 | 0.33 | 0.18 | 0.25 | 0.32 | 4 | 600 |
| Example 4 | Zinc oxide | 45 | 0.3 | Electric field | 0.35 | 0.31 | 0.21 | 0.26 | 0.19 | 4 | 600 |
| Example 5 | Silicon carbide | 30 | 0.3 | Electric field | 0.22 | 0.24 | 0.16 | 0.24 | 0.17 | 3 | 580 |
| Example 6 | Metal silicon | 35 | 0.3 | Mixing in advance | 0.17 | 0.25 | 0.18 | 0.18 | 0.26 | 2 | 550 |
| Comparative Example 1 | Metal silicon | 35 | 0.3 | None | 0.04 | −0.01 | −0.01 | −0.05 | −0.08 | 0 | 150 |
| Comparative Example 2 | Magnesium oxide | 43 | 0.3 | None | 0.11 | 0.18 | 0.14 | 0.12 | 0.13 | 0 | 145 |
| Comparative Example 3 | Aluminum oxide | 50 | 0.3 | None | 0.13 | 0.09 | 0.11 | 0.19 | 0.15 | 0 | 98 |

TABLE 1-continued

| | Thermally conductive particles | | Iron oxide particles | | Localization index M | | | | | Number of positions of 0.2 or more and less than 0.8 | Heating belt durability (1,000 sheets) |
|---|---|---|---|---|---|---|---|---|---|---|---|
| | Kind | Blending ratio (% by volume) | Blending ratio (% by volume) | Localization method | M1 | M2 | M3 | M4 | M5 | | |
| Comparative Example 4 | Zinc oxide | 45 | 0.3 | None | 0.16 | 0.10 | 0.12 | 0.13 | 0.17 | 0 | 102 |
| Comparative Example 5 | Silicon carbide | 30 | 0.3 | None | 0.02 | −0.09 | 0.11 | −0.05 | 0.02 | 0 | 167 |

From the results in Table 1, when comparing the Examples and the Comparative Examples, it was found that when the localization index M is 0.2 or more and less than 0.8 in at least three of the five sampling positions, the durability of the heating belt is improved. Further, it can be seen that the durability is further improved when the value exceeds 0.2 at four of the five sampling positions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-080421, filed Apr. 19, 2019, which is hereby incorporated by reference herein in its entirety.

What is claimed is:

1. A fixing member comprising:
    a substrate, and
    an elastic layer on the substrate,
    wherein:
    the elastic layer includes:
        rubber,
        thermally conductive particles dispersed in the rubber, and
        iron oxide particles dispersed in the rubber,
    a content of the thermally conductive particles in the elastic layer is 30% by volume to 50% by volume,
    a content of the iron oxide particles in the elastic layer is 0.01% by volume to 1.0% by volume,
    the thermally conductive particles are at least one selected from the group consisting of aluminum oxide, metal silicon, magnesium oxide, zinc oxide, and silicon carbide, and
    the iron oxide particles have a localization index M of 0.2 to less than 0.8, wherein the localization index M is determined by steps (i) to (v):
    (i) obtaining an image of a rectangle area of 40 μm in length and 59 μm in width placed at an arbitrary position in a cross section in a thickness direction of the elastic layer, the image having a resolution of 682 pixels in length and 1024 pixels in width, and determining center-of-gravity coordinates of the iron oxide particles present in the image;
    (ii) creating a Euclidean distance map showing a distance from each of points corresponding to pixels other than pixels showing the thermally conductive particles among pixels in the image, to outer surfaces of the thermally conductive particles closest to each of the points;
    (iii) obtaining a cumulative relative frequency distribution Ga of a distance from each of the center-of-gravity coordinates of each of the iron oxide particles to an outer surface of the thermally conductive particles closest to the each of the center-of-gravity coordinates of the each of the iron oxide particles, with a section length of 0.1 μm, referring to the center-of-gravity coordinates of the each of the iron oxide particles and the Euclidean distance map;
    (iv) obtaining a cumulative relative frequency distribution Gr of a distance from the each of points corresponding to the pixels other than the pixels showing the thermally conductive particles in the image to the outer surfaces of the thermally conductive particles closest to each of the points, with a section length of 0.1 μm, referring to the Euclidean distance map; and
    (v) subtracting a value of the number of the cumulative relative frequency distribution Gr from a value of the number of the cumulative relative frequency distribution Ga to determine a difference, for each of sections in a distance from the outer surface of the thermally conductive particles of up to 0.5 μm, and dividing a sum of the difference for each of the sections by a number of sections, which is 5, to obtain an average value, which is defined as the localization index M.

2. The fixing member according to claim 1, wherein when the localization index M is determined from each of cross sections in the thickness direction at any five positions of the elastic layer, the localization index M derived from the cross sections at least at three positions among the five positions, is 0.2 to less than 0.8.

3. The fixing member according to claim 1, wherein the rubber is a silicone rubber.

4. The fixing member according to claim 1, wherein a surface layer is provided directly or via an adhesive layer on a surface of the elastic layer on an opposite side to a surface on a side facing the substrate.

5. The fixing member according to claim 1, wherein a volume average particle size of the thermally conductive particles is 1 μm to 100 μm.

6. The fixing member according to claim 1, wherein a volume average particle size of the thermally conductive particles is 3 μm to 30 μm.

7. The fixing member according to claim 1, wherein a volume average particle size of the iron oxide particles is 0.01 μm to 0.50 μm.

8. The fixing member according to claim 1, wherein the fixing member is a fixing belt having an endless shape.

9. The fixing member according to claim 1, wherein the fixing member is a fixing belt for a fixing device which fixes an unfixed toner image on a recording material using the fixing belt heated by non-radiant heat.

10. The fixing member according to claim 8, wherein a thickness of the elastic layer is 200 μm to 500 μm.

11. A heat fixing device comprising:
a heating member, and
a pressure member disposed to face the heating member, wherein:
the heating member is a fixing member,
the fixing member includes:
   a substrate, and
   an elastic layer on the substrate,
the elastic layer includes:
   rubber,
   thermally conductive particles dispersed in the rubber, and
   iron oxide particles dispersed in the rubber,
a content of the thermally conductive particles in the elastic layer is 30% by volume to 50% by volume,
a content of the iron oxide particles in the elastic layer is 0.01% by volume to 1.0% by volume,
the thermally conductive particles are at least one selected from the group consisting of aluminum oxide, metal silicon, magnesium oxide, zinc oxide, and silicon carbide, and
the iron oxide particles have a localization index M of 0.2 to less than 0.8, wherein the localization index M is determined by steps (i) to (v):
(i) obtaining an image of a rectangle area of 40 μm in length and 59 μm in width placed at an arbitrary position in a cross section in a thickness direction of the elastic layer, the image having a resolution of 682 pixels in length and 1024 pixels in width, and determining center-of-gravity coordinates of the iron oxide particles present in the image;
(ii) creating a Euclidean distance map showing a distance from each of points corresponding to pixels other than pixels showing the thermally conductive particles among pixels in the image, to outer surfaces of the thermally conductive particles closest to each of the points;
(iii) obtaining a cumulative relative frequency distribution Ga of a distance from each of the center-of-gravity coordinates of each of the iron oxide particles to an outer surface of the thermally conductive particles closest to the each of the center-of-gravity coordinates of the each of the iron oxide particles, with a section length of 0.1 μm, referring to the center-of-gravity coordinates of the each of the iron oxide particles and the Euclidean distance map;
(iv) obtaining a cumulative relative frequency distribution Gr of a distance from the each of points corresponding to the pixels other than the pixels showing the thermally conductive particles in the image to the outer surfaces of the thermally conductive particles closest to each of the points, with a section length of 0.1 μm, referring to the Euclidean distance map; and
(v) subtracting a value of the number of the cumulative relative frequency distribution Gr from a value of the number of the cumulative relative frequency distribution Ga to determine a difference, for each of sections in a distance from the outer surface of the thermally conductive particles of up to 0.5 μm, and dividing a sum of the difference for each of the sections by a number of sections, which is 5, to obtain an average value, which is defined as the localization index M.

12. A fixing device comprising:
a fixing member having an endless shape,
a pressure member, and
a heater for heating the fixing member by non-radiant heat or radiant heat,
wherein the fixing device is configured to heat a recording material having an unfixed toner image in a nip portion formed by the fixing member and the pressure member to fix the unfixed toner image on the recording material, and
wherein the fixing member includes:
a substrate, and
an elastic layer on the substrate,
the elastic layer includes:
   rubber,
   thermally conductive particles dispersed in the rubber, and
   iron oxide particles dispersed in the rubber,
a content of the thermally conductive particles in the elastic layer is 30% by volume to 50% by volume,
a content of the iron oxide particles in the elastic layer is 0.01% by volume to 1.0% by volume,
the thermally conductive particles are at least one selected from the group consisting of aluminum oxide, metal silicon, magnesium oxide, zinc oxide, and silicon carbide, and
the iron oxide particles have a localization index M of 0.2 to less than 0.8 wherein the localization index M is determined by steps (i) to (v):
(i) obtaining an image of a rectangle area of 40 μm in length and 59 μm in width placed at an arbitrary position in a cross section in a thickness direction of the elastic layer, the image having a resolution of 682 pixels in length and 1024 pixels in width, and determining center-of-gravity coordinates of the iron oxide particles present in the image;
(ii) creating a Euclidean distance map showing a distance from each of points corresponding to pixels other than pixels showing the thermally conductive particles among pixels in the image, to outer surfaces of the thermally conductive particles closest to each of the points;
(iii) obtaining a cumulative relative frequency distribution Ga of a distance from each of the center-of-gravity coordinates of each of the iron oxide particles to an outer surface of the thermally conductive particles closest to the each of the center-of-gravity coordinates of the each of the iron oxide particles, with a section length of 0.1 μm, referring to the center-of-gravity coordinates of the each of the iron oxide particles and the Euclidean distance map;
(iv) obtaining a cumulative relative frequency distribution Gr of a distance from the each of points corresponding to the pixels other than the pixels showing the thermally conductive particles in the image to the outer surfaces of the thermally conductive particles closest to each of the points, with a section length of 0.1 μm, referring to the Euclidean distance map; and
(v) subtracting a value of the number of the cumulative relative frequency distribution Gr from a value of the number of the cumulative relative frequency distribution Ga to determine a difference, for each of sections in a distance from the outer surface of the thermally conductive particles of up to 0.5 μm, and dividing a sum of the difference for each of the sections by the number of sections, which is 5, to obtain an average value, which is defined as the localization index M.

13. The fixing device according to claim 12, wherein the heater is a heater which heats the fixing member by the non-radiant heat, and the fixing member is interposed between the heater and the pressure member in the nip portion.

\* \* \* \* \*